(12) United States Patent
Schlesinger et al.

(10) Patent No.: US 7,757,976 B2
(45) Date of Patent: Jul. 20, 2010

(54) METHOD OF PROCESSING NEPHELINE SYENITE POWDER TO PRODUCE AN ULTRA-FINE GRAIN SIZE PRODUCT

(75) Inventors: Louis M. Schlesinger, Spruce Pine, NC (US); Mauricio Durán Sánchez, Nuevo Leon (MX); Gerardo Hernandez Gonzalez, Nuevo Leon (MX); Artemio Gonzalez Acevedo, Nuevo Leon (MX)

(73) Assignee: Unimin Corporation, New Canaan, CT (US)

( * ) Notice: Subject to any disclaimer, the term of this patent is extended or adjusted under 35 U.S.C. 154(b) by 98 days.

(21) Appl. No.: 12/009,693

(22) Filed: Jan. 22, 2008

(65) Prior Publication Data
US 2008/0185463 A1 Aug. 7, 2008

Related U.S. Application Data

(60) Provisional application No. 60/899,906, filed on Feb. 7, 2007.

(51) Int. Cl.
B02C 19/00 (2006.01)
(52) U.S. Cl. ......................................... 241/19; 241/172
(58) Field of Classification Search .................. 241/30, 241/172, 19, 79.1
See application file for complete search history.

(56) References Cited

U.S. PATENT DOCUMENTS

| | | | |
|---|---|---|---|
| 2,269,912 A | 1/1942 | Ladoo | |
| 2,765,074 A | 10/1956 | Diamond | |
| 4,551,241 A | 11/1985 | Saverse et al. | |
| 4,850,541 A | 7/1989 | Hagy | |
| 4,869,786 A | 9/1989 | Hanke | |
| 4,883,714 A | 11/1989 | Stockl et al. | |
| 4,885,832 A | 12/1989 | English | |
| 4,979,686 A | 12/1990 | Szegvari et al. | |
| 5,080,293 A | 1/1992 | Szegvari et al. | |
| 5,199,656 A | 4/1993 | Szegvari et al. | |
| 5,380,356 A | 1/1995 | Gundlach et al. | |

(Continued)

OTHER PUBLICATIONS

Unimin Corporation, Minex Functional Fillers and Extenders Technical Data, May 2001. pp. 1 and 2.

(Continued)

*Primary Examiner*—Mark Rosenbaum
(74) *Attorney, Agent, or Firm*—Rankin, Hill & Clark LLP

(57) ABSTRACT

The method of converting nepheline syenite particulate feedstock with a grain size profile to an ultra-fine grain finish product for subsequent commercial use, the ultra-fine grain final product has a maximum grain size of less than about 6 microns. The method comprising: providing a dry feedstock with a controlled maximum particle size greater than about 20 microns; grinding the feedstock in a dry state by passing the feedstock vertically downward through a continuous, high-speed stirred ball mill whereby the feedstock is ground into an intermediate powder having a drastically reduced grain size profile than the grain size profile of the feedstock; and passing the intermediate powder from the mill through an air classifier using a rapidly moving high speed air stream moving along a given path to convey the ultra-fine grain product along the path and from the classifier and to allow coarse particulate material including particles larger than the ultra-fine product to be separated and then expelled from the classifier.

19 Claims, 18 Drawing Sheets

U.S. PATENT DOCUMENTS

| | | | |
|---|---|---|---|
| 5,530,057 A | 6/1996 | Humphrey et al. | |
| 5,686,507 A | 11/1997 | Hermele et al. | |
| 5,709,909 A | 1/1998 | Leibfarth et al. | |
| 5,866,646 A | 2/1999 | Radosta | |
| 5,883,029 A | 3/1999 | Castle | |
| 5,961,943 A | 10/1999 | Komatsu et al. | |
| 6,074,474 A | 6/2000 | Broome et al. | |
| 6,596,837 B2 | 7/2003 | Hogge | |
| 6,739,456 B2 | 5/2004 | Svoronos et al. | |
| 6,905,634 B2 | 6/2005 | Burnell-Jones | |
| 7,008,513 B2 | 3/2006 | Davenport et al. | |
| 2004/0087433 A1 | 5/2004 | Herold | |
| 2004/0175407 A1 | 9/2004 | McDaniel | |
| 2005/0167534 A1 | 8/2005 | Tomikawa et al. | |
| 2006/0075930 A1 | 4/2006 | Wang et al. | |
| 2006/0078748 A1 | 4/2006 | Ambrose et al. | |
| 2006/0140878 A1 | 6/2006 | Cornelius | |

OTHER PUBLICATIONS

International Search Report dated Dec. 6, 2007 (Appln. No. PCT/US07/15848; filed Jul. 12, 2007).
S. S. Ibrahim, H.A. Mohamed, T.R. Boulos, "Dry Magnetic Separation of Nepheline Syenite Ores"; Physiochemical Problems of Mineral Processing, 36 (2002) 173-183.
U.S. Appl. No. 60/830,562, filed Jul. 13, 2006, Janik et al.
U.S. Appl. No. 60/906,386, filed Mar. 12, 2007, Janik et al.
U.S. Appl. No. 11/599,514, filed Nov. 14, 2006, Janik et al.
International Search Report dated May 9, 2008 (Appln. No. PCT/US08/00843, filed Jan. 23, 2008).
Written Opinion dated May 9, 2008 (Appln. No. PCT/US08/00843, filed Jan. 23, 2008).
Union Process, Inc. 2004 Brochure entitled "Dry Grinding Attritors".
"Some Fundamental Properties of Nepheline Syenite" by C.J. Koenig; pp. 35-38, Jan. 2006.
International Preliminary Report on Patentability, dated Sep. 1, 2009 in connection with PCT/US08/00843, filed Jan. 23, 2008.
Office Action, dated Dec. 7, 2009 in connection with Canadian Appln. No. 2,618,864, filed Jan. 23, 2008.

FIG. 9

| FEEDSTOCK F | | PARTICLE SIZE FP | | GRINDING CONDITIONS | | | | |
|---|---|---|---|---|---|---|---|---|
| MOHS NO. | SG | D50 (μm) | D98 (μm) | MEDIA M | | | FEED (mtph) | DEG. % WT | CLASSIFIER ROTOR RPM |
| | | | | TYPE | SIZE (mm) | MOHS NO. | | | |
| 6 | 2.6 | 1.8 | 5.6 | Ce-ZrO$_2$ | 2.2-2.4 | 9 | 1.5kg/min | <1.6% | ≈1400 |

FIG. 11

| | D99.99 | D99 | D95 | D90 | D75 | D50 | D25 | D10 | MEAN |
|---|---|---|---|---|---|---|---|---|---|
| FINAL PRODUCT | 5.54 | 4.87 | 4.05 | 3.51 | 2.56 | 1.65 | 0.76 | 0.404 | 1.80 |

|  | % TAPPI BRIGHTNESS | L* | a* | b* |
|---|---|---|---|---|
| PRODUCT FP | 89.64 | 96.14 | -0.06 | 0.47 |

FIG. 12

| | FEED F MINEX 3 | | COARSE CM | | PRODUCT FP | | EFFICIENCIES | |
|---|---|---|---|---|---|---|---|---|
| | D98 | D50 | D98 | D50 | D98 | D50 | OVERSIZE | UNDERSIZE |
| AVERAGE | 61.5 | 10.6 | 39.8 | 3.5 | 5.8 | 1.7 | 98% | 13% |

FIG. 14

MILL & CLASSIFIER OPERATING DATA

| | MILL | | AIR CLASSIFIER | | DIETHYL GLYCOL | | COOLING WATER | |
|---|---|---|---|---|---|---|---|---|
| | MILL AMPS | AVG. kg/hr | ROTOR RPM | FAN RPM | ml/min | % BY WT. | °C IN | °C OUT |
| COUNT | 52 | 61 | 61 | 61 | 61 | 61 | 53 | 53 |
| AVERAGE | 135 | 78.05 | 1419 | 1584 | 9 | 0.76 | 16 | 26 |
| MIN. | 120 | 29.71 | 1230 | 1440 | 0 | 0.00 | 8 | 21 |
| MAX. | 153 | 135.33 | 1525 | 1690 | 17 | 1.54 | 20 | 30 |
| STD DEV. | 11 | 25.32 | 88 | 105 | 4.8 | 0.37 | 2.5 | 2.4 |

FIG. 15

CLASSIFIER PRODUCT

| | PARTICLE SIZE DISTRIBUTION | | | | | | COLOR | | |
|---|---|---|---|---|---|---|---|---|---|
| | D98 | D95 | D75 | D50 | D25 | D10 | L* | a* | b* |
| COUNT | 61 | 61 | 61 | 61 | 61 | 61 | 61 | 61 | 61 |
| AVERAGE | 5.55 | 4.43 | 2.52 | 1.63 | 1.02 | 0.67 | 94.39 | -0.10 | 0.26 |
| MIN. | 4.04 | 3.44 | 2.12 | 1.42 | 0.91 | 0.59 | 91.64 | -0.19 | -0.06 |
| MAX. | 9.04 | 6.87 | 3.47 | 2.11 | 1.26 | 0.79 | 96.31 | 0.00 | 0.54 |
| STD DEV. | 1.06 | 0.70 | 0.30 | 0.16 | 0.09 | 0.04 | 1.18 | 0.05 | 0.15 |

FIG. 16

MILL RETURN (CLASSIFIER COARSE)

| COUNT | PARTICLE SIZE DISTRIBUTION | | | | | | | COLOR | | |
|---|---|---|---|---|---|---|---|---|---|---|
| | D98 | D95 | D75 | D50 | D25 | D10 | L* | a* | b* | |
| | 59 | 59 | 59 | 59 | 59 | 59 | 59 | 59 | 59 | 59 |
| AVERAGE | 28.90 | 17.66 | 5.96 | 2.88 | 1.48 | 0.86 | 93.94 | -0.08 | 0.37 | |
| MIN. | 8.59 | 6.39 | 3.13 | 1.92 | 1.16 | 0.74 | 90.98 | -0.18 | -0.29 | |
| MAX. | 56.99 | 33.77 | 11.70 | 5.86 | 2.53 | 1.16 | 95.98 | -0.01 | 0.99 | |
| STD DEV. | 10.35 | 5.71 | 1.63 | 0.70 | 0.24 | 0.08 | 1.36 | 0.04 | 0.23 | |

FIG. 17

MILL EXIT (CLASSIFIER FEED)

| | PARTICLE SIZE DISTRIBUTION | | | | | | COLOR | | |
|---|---|---|---|---|---|---|---|---|---|
| | D98 | D95 | D75 | D50 | D25 | D10 | L* | a* | b* |
| COUNT | 58 | 58 | 58 | 58 | 58 | 58 | 58 | 58 | 58 |
| AVERAGE | 28.58 | 17.73 | 5.81 | 2.73 | 1.39 | 0.83 | 94.04 | -0.08 | 0.36 |
| MIN. | 14.63 | 9.55 | 3.80 | 1.97 | 0.08 | 0.56 | 89.43 | -0.18 | -0.24 |
| MAX. | 50.36 | 31.27 | 9.38 | 4.22 | 1.89 | 0.99 | 96.26 | 0.00 | 0.88 |
| STD DEV. | 8.39 | 4.93 | 1.34 | 0.47 | 0.23 | 0.06 | 1.49 | 0.05 | 0.22 |

FIG. 18

METHOD OF PROCESSING NEPHELINE SYENITE POWDER TO PRODUCE AN ULTRA-FINE GRAIN SIZE PRODUCT

This application claims the benefit of U.S. provisional application Ser. No. 60/899,906 filed on Feb. 7, 2007. This provisional application is also incorporated by reference in this application. Prior pending application Ser. No. 11/803,093, filed May 11, 2007 is incorporated by reference.

The invention relates to the processing of granular igneous rock and more particularly to an improved method of processing nepheline syenite powder to produce an ultra-fine grain size nepheline syenite product having an effective grain size of less than 6 microns to give the properties and enhancements set forth in application UMEE 200075. The method produces a stable, usable filler product without the need for drying the milled powder or the final product. The final product has a narrow particle size distribution with a maximum grain size of 6 microns.

BACKGROUND OF INVENTION

In glass and ceramic manufacturing, nepheline syenite provides alkalies that act as a flux to lower melting temperature of a glass or ceramic mixture, prompting faster melting and fuel savings. In glass, nepheline syenite powder also supplies aluminum which gives improved thermal endurance, increases chemical durability and increases resistance to scratching and breaking. Furthermore nepheline syenite powder is used as a filler or extender in paints, coatings, plastics and paper. It is a desirable material because it contains no free silica and still functions as effectively as a free silica based filler or extender. The material is an inorganic oxide having mechanical characteristics similar to the free silica material for which it is a substitute. It has been available for years in fine grains as disclosed in an 1938 article by C. J. Koenig entitled *Some Fundamental Properties of Nephelene Syenite* which is incorporated by reference herein. These mechanical properties involve the use of a fine grain particulate form of nepheline syenite powder which is abrasive. Consequently, the granular nepheline syenite has a tendency to abrade and erode rapidly equipment used in processing the end product employing the nepheline syenite powder. It has been determined that by reducing the particle size of any organic oxide material, such as nepheline syenite, the abrasive properties of the material are reduced. Consequently, it is common to provide nepheline syenite powder with a relatively small particle size for the purposes of allowing effective dispersion in the product aided by use of the nepheline syenite. Several advantages are realized when dispersing fine grain nepheline syenite in the carrier product. These relate to hardness, gloss and brightness of the final product. Patents disclosing the advantage of using nepheline syenite include Gundlach U.S. Pat. No. 5,380,356, Humphrey U.S. Pat. No. 5,530,057; Hermele U.S. Pat. No. 5,686,507 and Broome U.S. Pat. No. 6,074,474. These representative patents showing the use of fine grain nepheline syenite powder are incorporated by reference herein. They illustrate the advantages of providing this particular inorganic oxide in a variety of grain sizes for a variety of applications. It has been found that nepheline syenite powder having an ultra-fine grain of less than about 20 microns has substantial advantages and drastically increases the usefulness of nepheline syenite powder in various products. This form of nepheline syenite powder is sold by Unimin Corporation of New Canaan, Conn. as Minex 10. Recently, it has been found experimentally and by testing that nepheline syenite powder with a grain size less than about 6 microns produces drastically improved physical and processing characteristics. These are described in prior application UMEE 200075. Such ultra-fine grain nepheline syenite can be conveyed through manufacturing equipment with very little abrasive wear and substantially enhances many characteristics of the end product utilizing this ultra-fine grain nepheline syenite powder especially when used in paints and other coatings. In an attempt to accomplish this ultra-fine grain particle size of nepheline syenite, the granulated material was wetted and then ground in a slurry condition in a micro grinder. Thereafter, the ultra-fine particles were dried by a rotary kiln or other process drier. The ultra-fine particles however were highly active and tended to agglomerate in the liquid carrier so that the end result contained agglomerations. Thus a number of particles had an effective particle size substantially greater than the desired small particle size of the ultra-fine nepheline syenite powder. Thus, the effectiveness of providing nepheline syenite with a controlled grain size of less than 6 microns has been less than satisfactory until Unimin Corporation developed a system utilizing a dry ball mill and an air classifier. Until that time, a nepheline syenite product with a maximum grain size drastically less than 10 microns for an effective size and particularly less than 5-6 microns for an effective size was not commercially viable until recently made by a dry milling process. After Unimin Corporation, assignee of this application, developed a system for producing an ultra-fine nepheline syenite having a grain size less than 5-6 microns, there was determined to be a substantial commercial need for a system that more efficiently produces this desired ultra-fine nepheline syenite product. The term "less than" a certain grain size in the related art means that at least 99.99% of the particle sizes are less than a designated particle size.

THE INVENTION

The present invention is directed to the invention of an efficient system for producing nepheline syenite powder having a grain size of less than about 6 microns. It has been found that a dry ball mill and an air classifier can product nepheline syenite with more than 99% of the particles having a size less than 5-6 microns. The combination of a dry ball mill and an air classifier to produce the nepheline syenite powder of the desired ultra-fine grain size did not result in the development of a highly efficient system for producing such nepheline syenite powder. The present invention is directed to a method of making the desired nepheline syenite powder which has substantially increased efficiency and, thus, cost savings. The product itself will be commercially available at lower cost to create improved products, such as coatings. It has been determined to be beneficial to use extremely fine grain nepheline syenite powder which is not agglomerated and has been produced by a dry milling process. This invention is directed to a novel method for making this type ultra-fine grain nepheline syenite powder.

The present invention accomplishes the objective set forth above by employing a method of converting nepheline syenite particulate feedstock with a grain size profile to an ultra-fine grain size finish product for a subsequent commercial use. This ultra-fine grain product has a grain size of less than about 6 microns. The novel method involves providing a dry feedstock with a particulate size greater than about 20 microns. In practice, the feedstock has a maximum grain size of about 60 microns with a given particle size distribution where D50 is over about 10. The feedstock is passed vertically downward through a continuous, high speed stirred ball mill having stirring arms rotating at a selected high speed in a vertically extending chamber filled with a grinding media. The feedstock is ground into an intermediate powder by the action of the media as the media is moved at high speed by the rotating stirring arms. The intermediate powder has a drastically reduced grain size and a shifted grain size distribution profile so the profile is smaller than the grain size profile of the incoming feedstock. The profile has a D99 of 25-35 and a D50 of about 2.5 to 3.5. Thereafter, the intermediate powder with a shifted grain size distribution profile is passed through an air classifier using a high speed air stream moving along a given path to convey the ultra-fine grain product along the path and from the classifier. The classifier also allows the coarse particulate material including particles larger than the ultra-fine product to be separated from the targeted 6 micron and smaller particles by centrifugal force and gravity. The coarse material is then expelled from the classifier. The final product of ultra-fine nepheline syenite powder with particles less than 6 microns with a D99 of about 6 and a D50 of about 1.5 to 2.0 is then collected for shipment to the end user. The coarse material is returned to the high speed stirred ball mill for regrinding. The combination of a vertical high speed stirred ball mill with a subsequent air classifier using a rapid moving air stream has been found to produce nepheline syenite powder with a grain size of less than 6 microns in a highly efficient and effective manner. In accordance with an aspect of the present invention, the air classifier is a specific type of air classifier having two stages with a first stage to separate the coarse material and a second stage to remove dust from the final product being removed from the air classifier.

In the preferred embodiment of the invention, the feedstock has a particle size wherein 99% of the particles are less than about 50 microns. The selected speed of the vertical high speed stirred ball mill is increased to about 200-450 rpm. The media in the chamber has a grain size of less than 5 mm and preferably in the range of 2.0-2.5 mm. The media is selected to have a hardness of Mohs 9 and is ceria-stabilized zirconium oxide. Tests indicate that aluminum oxide and tungsten carbide can be substituted for the preferred media. To assure the high efficiency, the media is filled to about 50-80% of the chamber and is preferably about in the middle of that range or about 70-77%. In accordance with an aspect of the invention, a grinding aid is added to the media at a given feed rate. The grinding media is normally diethyl glycol. The rate of adding grinding aid is in the general range of 50-150 ml/min. The grinding aid has a dosage of less than 1.6% by weight. For the most efficient operation of the system, the feed rate for the stirred ball mill is in the general range of 0.5-2.3 kg/min. In practice, the feedstock has a grain size distribution or profile with about 20-30% particles with a grain size less than 5-6 microns and the intermediate powder directed from the mill to the air classifier has about 35-40% particles with a grain size of less than 5-6 microns. The discharge gate of the mill has an opening in the general range of 0.5-1.5 mm to control the grinding time of the feedstock passing through the mill.

A secondary aspect of the invention is selection and use of a specific type of air classifier that has a main classifying chamber with a vertical blade rotating rejector operated at a high rotating speed and a low expansion chamber to suspend particles for classification by the rejector subject to the high speed air stream. In this type of classifier, called a "side draft" air classifier, has a fan operated at a high speed in the general range of 1500-1700 rpm. The rotating speed of the rejector is in the general range of 1200-1600 rpm and preferably above 1400 rpm.

By using this method specifically developed for processing nepheline syenite powder, an efficient production of nepheline syenite with a grain size of less than 5-6 microns is obtained. The inventive method has a high efficiency resulting from use of the novel vertical processing of the nepheline syenite feedstock by a stirred ball mill and an air classifier downstream of the novel stirred ball mill. The air classifier removes particles having a grain size that provides an Einlehner abrasive value of less than 100. This abrasive indicative value is preferably less than 50. In practice, the grain size separated by the air classifier from the intermediate powder created by the stirred ball mill is less than about 5-6 microns. The distribution of grain size is about 5 microns, for instance about 1-6 microns, so the particles are ultra-fine size and concentrated with a limited distribution profile. The D50 value for the final product is in the range of 1.5 to 2.0 and is targeted at about 1.85. The nepheline syenite is previously processed to produce the feedstock. In practice, the feedstock is nepheline syenite powder sold by Unimin Corporation of New Canaan, Conn. and identified as Minex 3 and has a controlled maximum grain size of about 50-60 microns. This feedstock is introduced into the vertically extending continuous, high speed stirred ball mill having stirring arms. The output of this ball mill is an intermediate powder with a greater amount of particles less than 6 microns. Such intermediate powder is then passed through the air classifier to produce the finished product. In an aspect of the invention, the air classifier is a die draft unit. In accordance with another aspect of the invention, the air classifier has a controlled humidity so the method is a dry ball milling with air classifying at a controlled humidity level. This broad concept is new and especially advantageous when the dry ball mill is a vertical, stirred ball mill.

The primary object of the present invention is the provision of a method for processing particulate nepheline syenite powder in a dry system wherein the resulting product sizes are less than about 6 microns which system is highly efficient and inexpensive to operate and uses a stirred ball mill. The method produces a powder having a D99 of about 5-6 microns, a D50 of about 1.9 microns and a D1 of less than 0.5 microns.

Another object of the present invention is the provision of a method of producing nepheline syenite powder having a grain size of less than about 5-6 microns which method utilizes a vertical dry stirred ball mill and an outlet air classifier to separate the powder from the ball mill into a coarse material and a final fine grain product.

Another object of the present invention is the provision of a method using a dry ball mill with an air classifier provided with an humidity control feature, especially a method wherein the dry mill is a vertical stirred ball mill. Yet a secondary feature of this object of the invention is the selection and use of a side draft air classifier.

Still a further object of the present invention is the provision of a method of processing nepheline syenite powder to produce a grain size less than about 5-6 microns using a dry ball mill that is efficiently operated in a vertical direction.

Yet another object of the present invention is the provision of a method as defined in the appended claims.

These and other objects and advantages will become apparent from the following description taken together with the accompanying drawings.

BRIEF DESCRIPTION OF DRAWINGS

FIG. 9 is a table presenting the grinding data for the novel method performed by the system illustrated in FIGS. 5-8;

FIG. 11 is a table regarding the particle size of the product as shown in the graph of FIG. 10;

FIG. 12 is a table illustrating the tested brightness and color of the final product produced in accordance with the method of the present invention;

FIG. 14 is a table providing a summary of the performance of the classifier selected for use in practicing the present invention;

FIG. 15 is a table providing the operating data for the mill and classifier used in practicing the present invention;

FIG. 16 represents the particle size distribution from the classifier together with the tested color characteristics of the product as produced by the method using the system shown in FIG. 7;

FIG. 17 is a table disclosing the particle distribution for the coarse material returned to the mill from the classifier and the measured colored characteristics of this coarse material;

FIG. 18 is a table illustrating the particle size distribution of the nepheline syenite intermediate product exiting the mill and entering the classifier together with the measured color characteristics of this product;

GENERIC DESCRIPTION OF THE INVENTION

Figure 1:
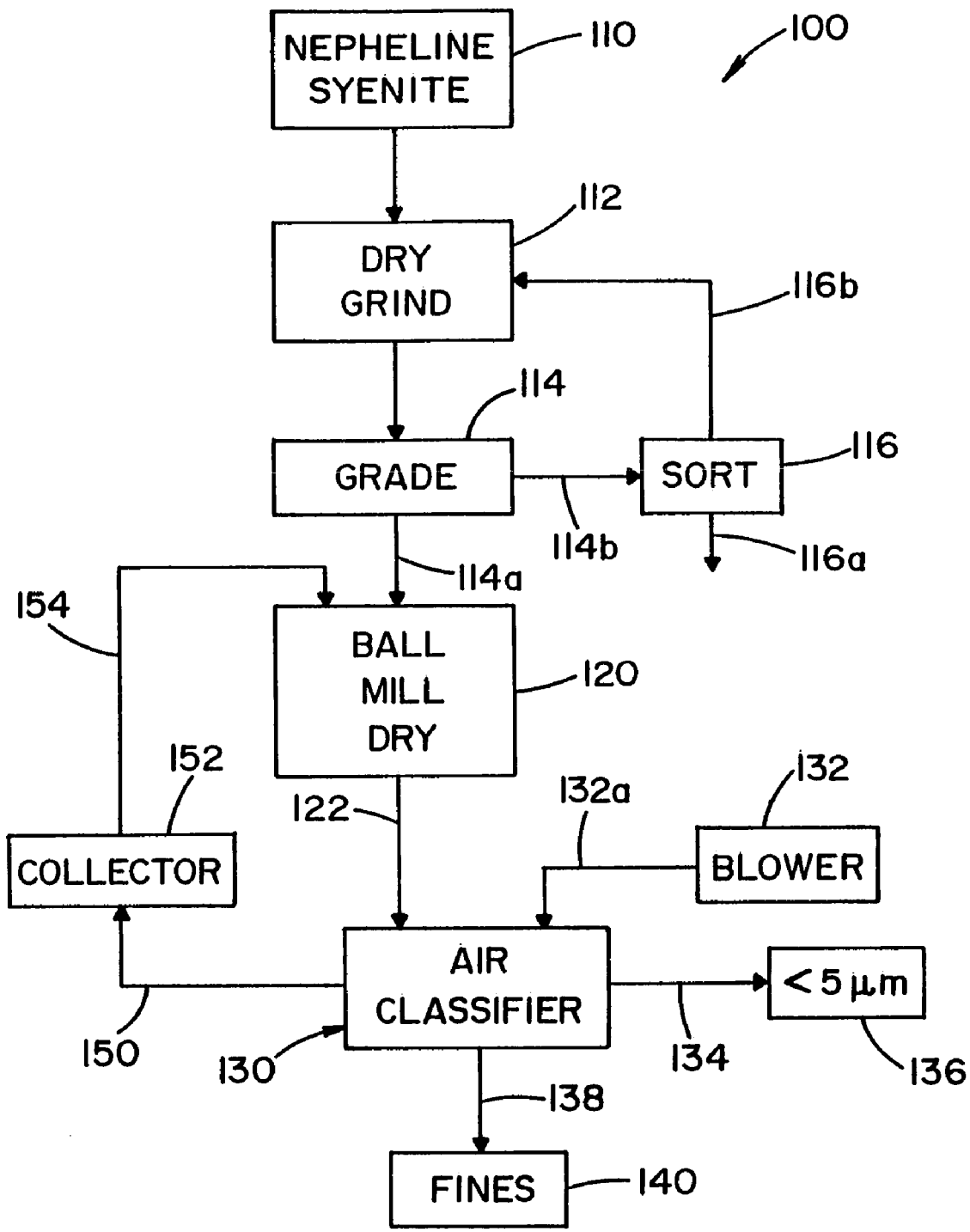
FIG. 1 is a block diagram of a generic method used in producing a nepheline syenite powder having an ultra-fine grain size of less than about 5-6 microns.

The showings are for the purpose of illustrating the preferred embodiment of the invention and not for the purpose of limiting same, FIG. 1 is a block diagram of a generic method 100 wherein a particulate nepheline syenite is processed to obtain an ultra-fine grain size less than 10 microns and preferably less than 6 microns. The method is used to control the grain size of the nepheline syenite where at least 99% of the nepheline syenite is below a set selected ultra-fine particle size. Furthermore, the distribution profile is quite narrow, i.e. in the range of about 5 microns. The invention does not produce particulate nepheline syenite with a large range of particle sizes that merely includes a mixture of ultra-fine particles and larger particles because the abrasive characteristic of the nepheline syenite particles increases drastically with increased particle size. Consequently, the invention involves at least 99% of the particle size being less than a set value, which value is preferably 5 to 6 microns. This is a different product than nepheline syenite wherein the particle size distribution profile is in the range of between 2 microns and 11 microns.

Generic method 100 employing a general concept is illustrated in FIG. 1 where nepheline syenite in granular form is supplied at first process step 110. The mined particulate material is ground in a dry grinder 112 using standard mechanical equipment so the resulting particles can be within a certain particle size using grading step 114. In the grading step, which can be done by a screen such as a 16 mesh screen, the particles exiting along outlet line 114a have a first given value. The first value is in the general range of about 1,000 microns. The use of a mechanical 16 mesh screen in the grading step allows the particles flowing along output line 114a to have a size forming optimum feed stock for ball mill 120. If the size of the particles from the dry grinder 112 is greater than the mesh size at step 114, the larger particles are transported along output line 114b to sorter 116. At the sorter, larger unusable particles are ejected along output line 116a and smaller particles are redirected to the grinder 112 through return line 116b. Thus, the inlet portion of method or system 100 produces a given first grain size which is conductive to subsequent processing according to the present invention. This grain size is selected to be 1,000 microns; however, this is only representative and the particles from output line 114a can have any particular given particle size. This is the first given grain size in method 100. In practice the graded nepheline syenite at outlet line 114a has a grain 25 mesh size (600 micron). Steps 110, 112 and 114 comprise a primary jaw and cone to reduce the mined product to clumps less than 6 inches, rotary kiln to dry the material, a cone crusher to reduce the rock to less than one inch and a tertiary crusher in the form of a vertical shaft impact crusher. The material is then graded to pass a 25 mesh screen and is provided at outlet line 114a.

Nepheline syenite having a particular given size in output line 114a is directed to a feed stock ball mill process step 120 operated to produce ultra-fine particles, without the addition of a liquid to slurry the particles. Thus, ultra-fine particles are ejected from ball mill of step 120 along output line 122. Any standard ultra-fine ball mill can be used for step 120. Ultra-fine particles from the ball mill of step 120 exit through output line 122 and are processed by a standard air classifier. This air classifier is adjusted by the process air velocity from blower 132. The blower directs high velocity air through line 132a into a standard air classifier step 130. The air classifier step removes particles less than 5 microns by directing such ultra-fine particles through output line 134. These particles can accumulate in collector 136. In accordance with standard air classifier procedure, particles having a maximum grain size of a given second value are separated and directed to collector 136. These particles are less than 10 microns and preferably less than 5 to 6 microns. In practice, over 99% of the particles have a grain size less than about 5 to 6 microns. Of course, air classifiers remove ultra-fine particles with a distribution profile. The profile is 5 to 6 microns to about 1 micron. The dust with a size less than about 0.5 micron is carried by air from blower 132 through line 138 to be collected in dust receptacle or collector 140. Air classifier 130 also has a large particle discharge line 150 directed to collector 152. From this collector, larger particles are recycled through line 154 back into the input of the ball mill of step 120. Feed stock from line 114a and returned particles from line 154 are processed by the dry ball mill step 120 and are directed through output line 122 into standard generic air classifier 130. The air classifier separates the desired particles for accumulation in collector 136. It also discharges unacceptable small particles into collector 140. Larger particles are recycled through collector 152. Thus, a continuous in-line method 100 accepts mined nepheline syenite and outputs nepheline syenite with ultrafine particles of less than 10 microns and preferably less than 5 to 6 microns. The distribution of particles of nepheline syenite produced by method 100 is in the general range of 1 to 5 microns. Consequently, a specific low value for the particle size is obtained for the natural mined material nepheline syenite. The distribution profile is less than about 4 microns and has a maximum size in the general range of 5 microns. A distribution profile of 4-5 microns with an upper value less than 10 microns and a lower value of at least 1 micron defines the output material of method 100.

Figure 2:
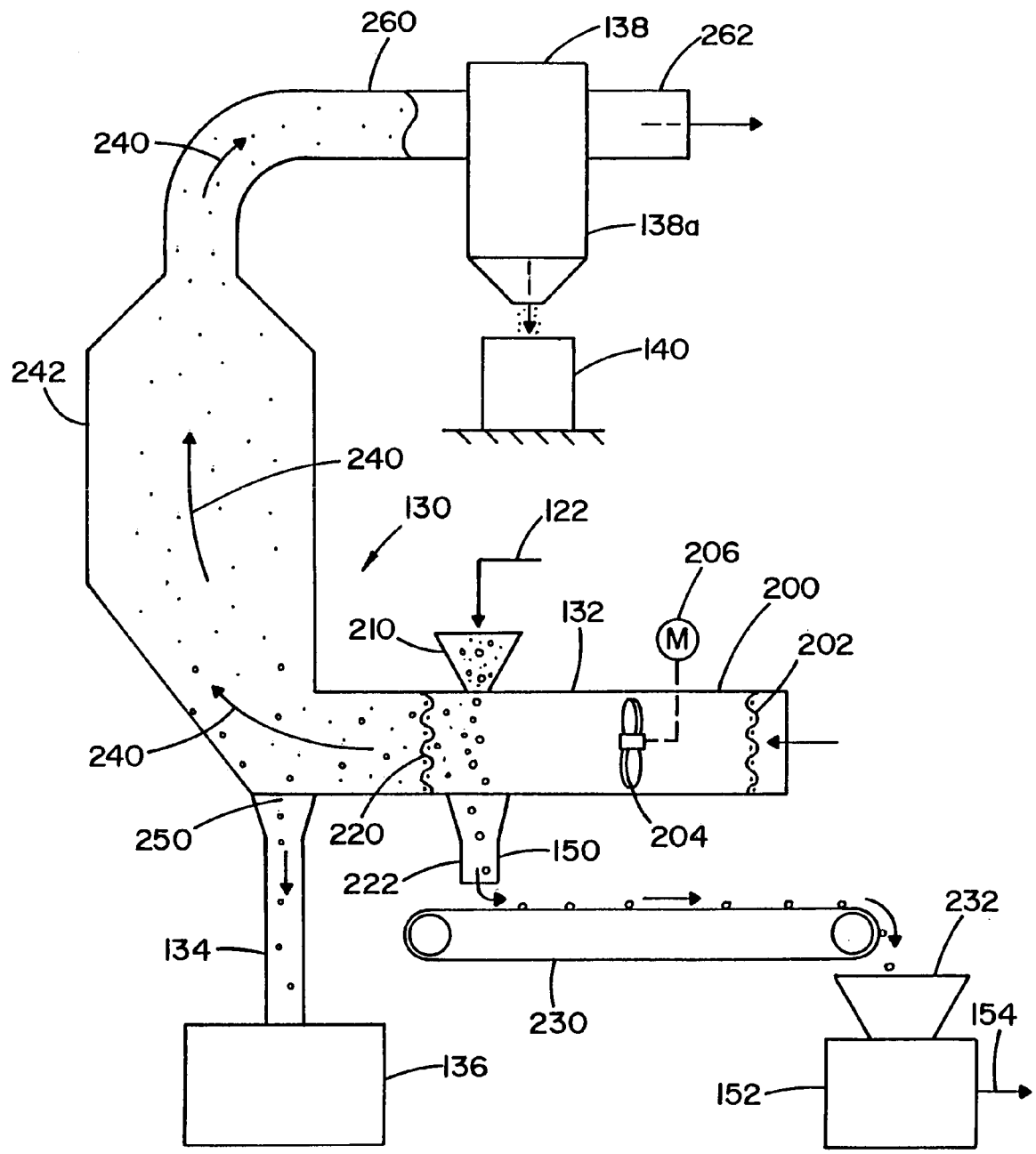
FIG. 2 is a schematic side elevational view representing a simplified air classifier to merely illustrate the general function of an air classifier after a dry ball mill.

As will be appreciated later, the invention involves the combination of a novel dry ball mill to produce ultra-fine particles without wet grinding in combination using a specific air classifier, which is a device that removes particles with a certain size range from air borne fine particles. For background, a schematic representation of a generic air classifier is illustrated functionally in FIG. 2. The particles are discharged directly as feed stock in line 122 into the air classifier 130. Air classifier 130 has an air inlet represented as inlet tunnel 200 for blower 132. Screen 202 prevents large particles of extraneous material from being drawn by the high flow of air in inlet or tunnel 200. In this background combination, the classifier speed is generally about 4,000 RPM with a total flow of about 6,000 CFM. Such high air velocity through inlet tunnel 200 is directed to an area below hopper 210 for accepting feed stock from line 222. Nepheline syenite is dropped from hopper 210 through inlet tunnel 200 where it is entrapped and carried by air through controlled baffle 220. Larger particles above a given value to be extracted by classifier 130 are discharged by gravity through line 222 which is outlet 150 of method 100 shown in FIG. 1. Such large particles are collected on conveyor 230 where they are transported to collector inlet funnel 232 for discharge into collector 152 for return to the ball mill by way of line 154, as schematically shown in FIG. 1. Air transport currents 140 pass through tunnel or tube 200 into a larger volume hood 242, where the pressure differential and carrying capacity of the air is controlled by the size of the hood compared to the velocity of the particle transporting air. This combination of air and hood allows the transporting air 240 to drop particles of a given size to be extracted in area 250 into outlet line 134 for depositing in collector 136. Thus, large particles are discharged by gravity into collector 152. Particles having the desired distribution range are deposited in collector 136 and other fines or dust smaller than the desired material to be separated by classifier 130 are carried through tube 260 to discharge 138 in the form of funnel 138a for discharging the fines or dust into collector 140. Air is discharged from line 262 as schematically represented in FIG. 2. Thus, the functions of an air classifier are illustrated in FIG. 2 where classifier 130 receives ultra-fine feed stock from line 122. This is the output produced by a dry ball mill used in step 120 of the generic method 100. The combination of a dry ball mill and an air classifier to provide a selected tight range of ultra-fine particle size for nepheline syenite has not been accomplished before discovery by Unimin Corporation of New Canaan Conn.

Figure 3:
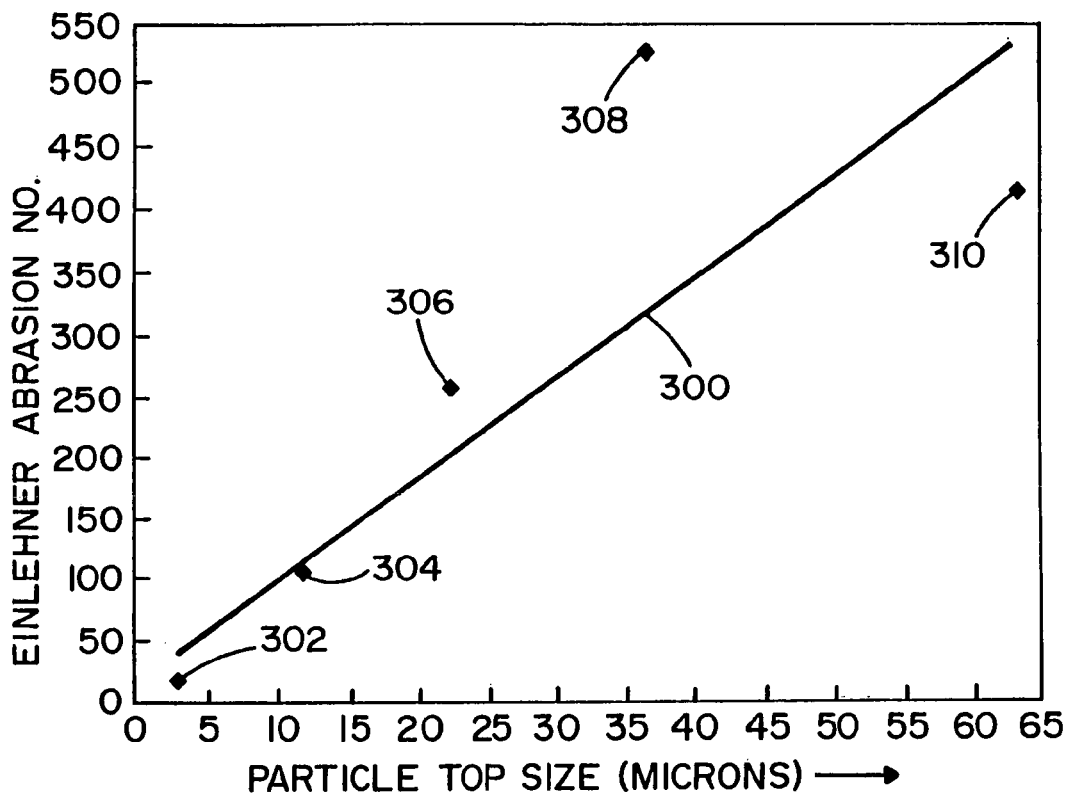
FIG. 3 is a graph of a constructed line representing the relationship between the grain size of nepheline syenite and its abrasive characteristics.

By processing nepheline syenite in accordance with generic method 100, it has been found that the Einlehner Abrasive Value (EAV) is less than 100 for a maximum grain size of 10 microns and a value of about 50 for the preferred embodiment wherein the material has a maximum grain size of 5 microns. In FIG. 3, line 300 is the linear regression of points 302, 304, 306, 308 and 310 which are samples of nepheline syenite having maximum particle size of 3 microns, 10 microns, 20 microns, 35 microns and 60 microns, respectively. The abrasion number or value (EAV) for material using these various samples determine the points shown on FIG. 3 to construct line 300 by linear regression. As can be seen, with a maximum grain size of 5 to 6 microns, an Einlehner Abrasion number or value of 50 is obtained. At 10 microns, the value or number is 100. Tests have indicated that the lower the abrasion number or value the less wear there is on equipment processing viscous material using nepheline syenite. It is desirable to have a value less than 100 and preferably about 50. This value is obtained when the grain size of the processed nepheline syenite is less than 5 microns and generally in the range of 1-5 microns. This is a very small range for the distribution profile and ultra-fine grain size. This produces an improved nepheline syenite heretofore not obtained economically in commercial quantities before produced by Unimin Corporation.

Figure 4:
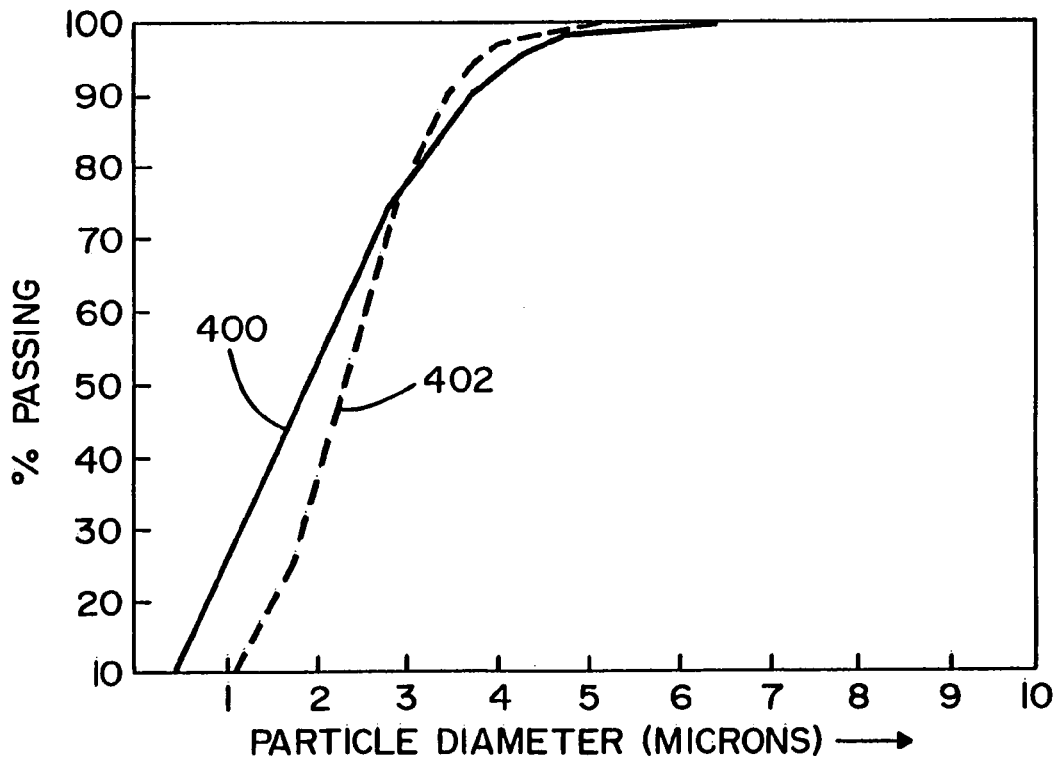
FIG. 4 is a graph comparing the distribution profile obtained between an experimental sub-six micron product and the sub-six micron product of the present invention.

After producing the product in accordance with the method as described in the flow chart or diagram of FIG. 1, the resulting product had a maximum grain size of 6 microns and a minimum grain size of about 0.5 microns. The distribution of the finished product is show in graph 400 in FIG. 4 wherein substantially all of the particles are less than 6 microns. The tested distribution indicates that the minimum grain size is 0.5 microns and only about 10% of the particles had this small size. To obtain a comparison of the distribution obtained by practicing method 100 with grain size distribution obtained only by an experimental laboratory process. A sub-5 micron nepheline syenite was produced in a laboratory environment. The distribution curve 402 was obtained for this experimental material having a grain size range of 1-6 microns. This product used a wet process to provide a comparison vehicle. As can be seen, the mass produced high volume commercial application of method 100 illustrated in FIG. 1 produces a distribution curve quite similar to the curve 402 of the experimental material where the particle size are controlled between 6 microns and about 1 micron. The only difference is that the mass produced commercial method 100 has a few particles with a lesser diameter than is possible by an experimental, laboratory controlled process for producing a representative sub-6 micron nepheline syenite. Generic method 100 produces nepheline syenite with an ultra-fine particle size in the range of 0.5-5.0 micron.

PREFERRED EMBODIMENT OF THE INVENTION

Figure 5:
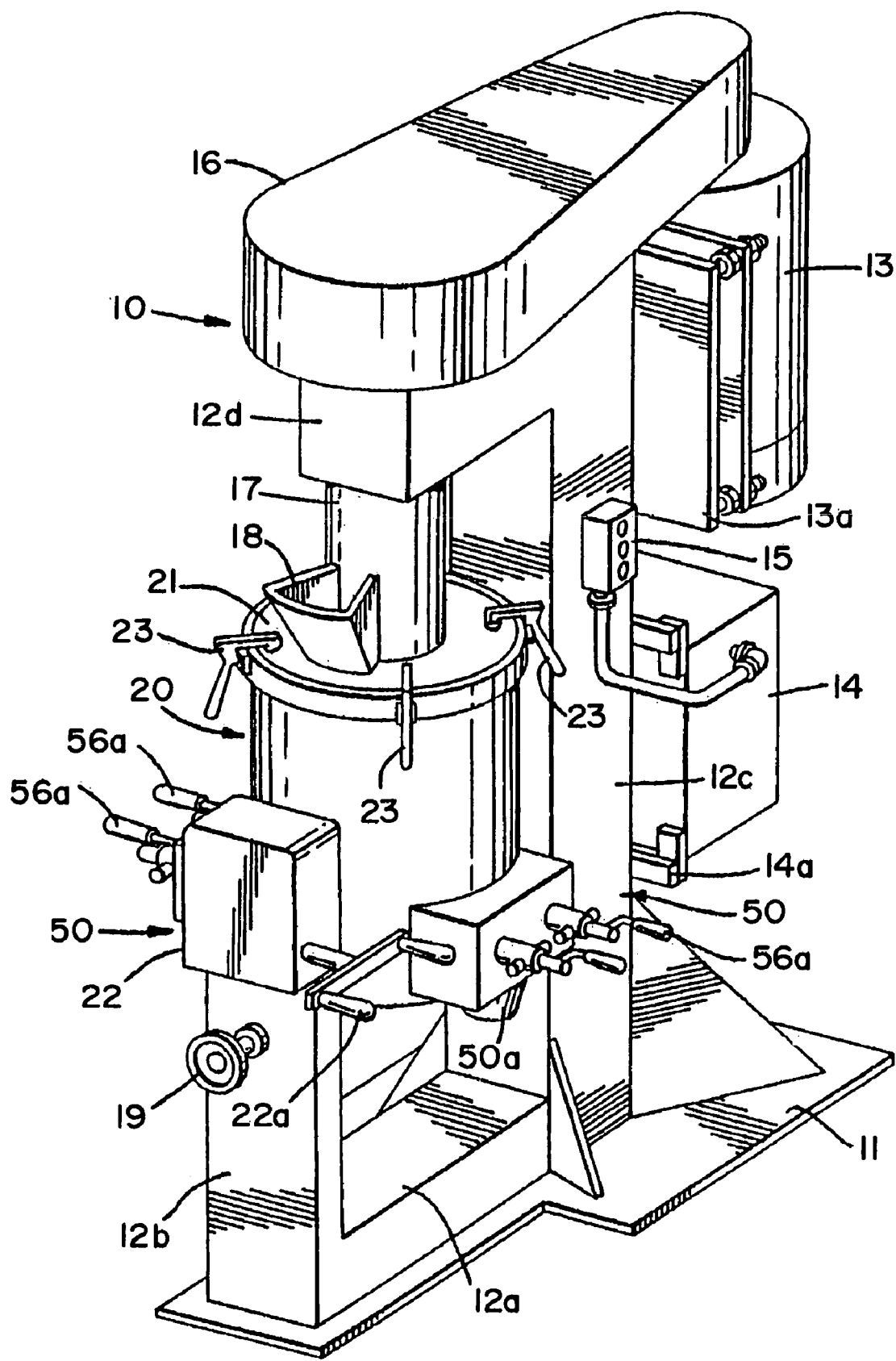
FIG. 5 is a pictorial view of the vertical stirred ball mill that performs the acts constituting a primary aspect of the novel method.
Figure 6:
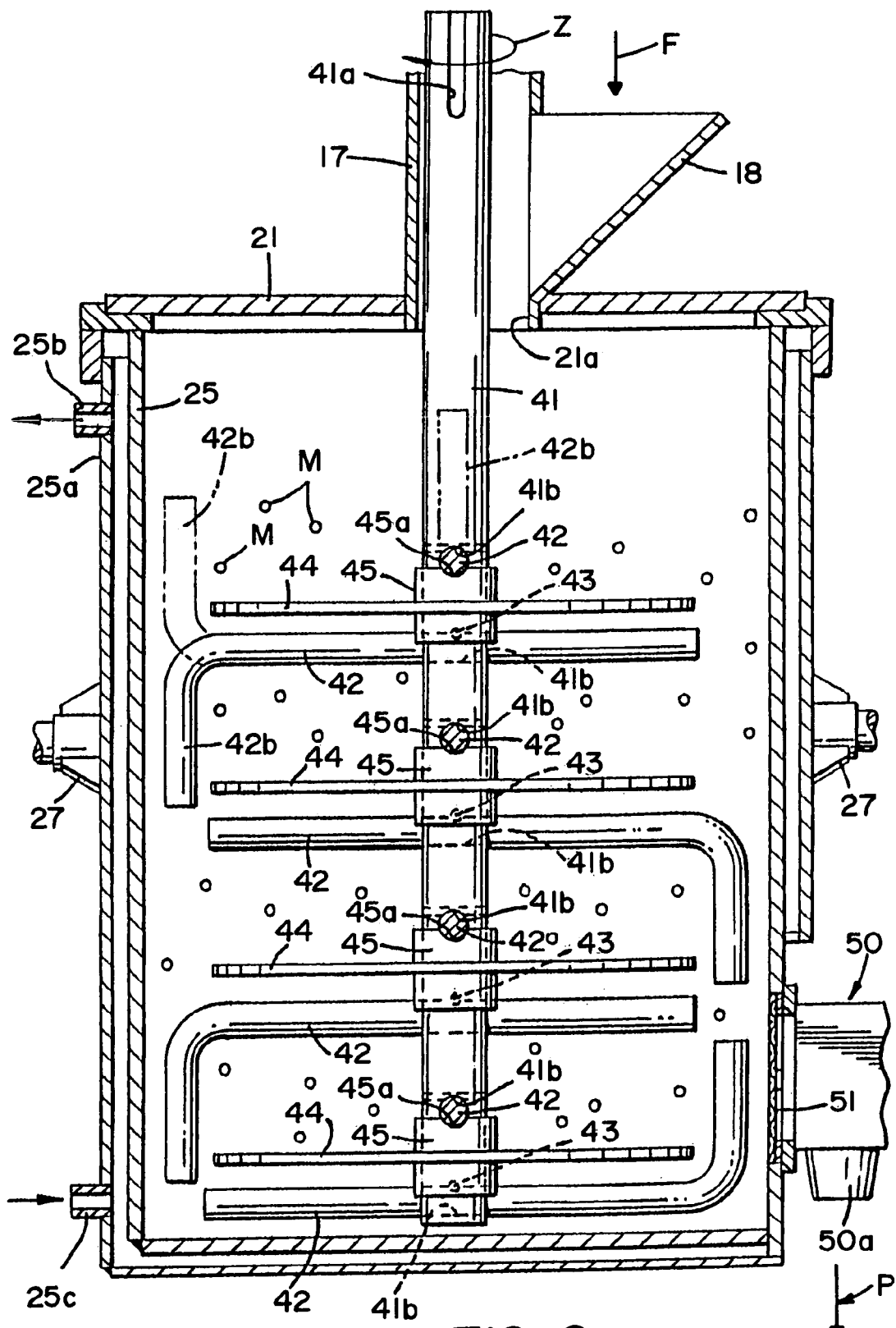
FIG. 6 is a cross-sectional view of the stirred ball mill illustrated in FIG. 5.
Figure 8:
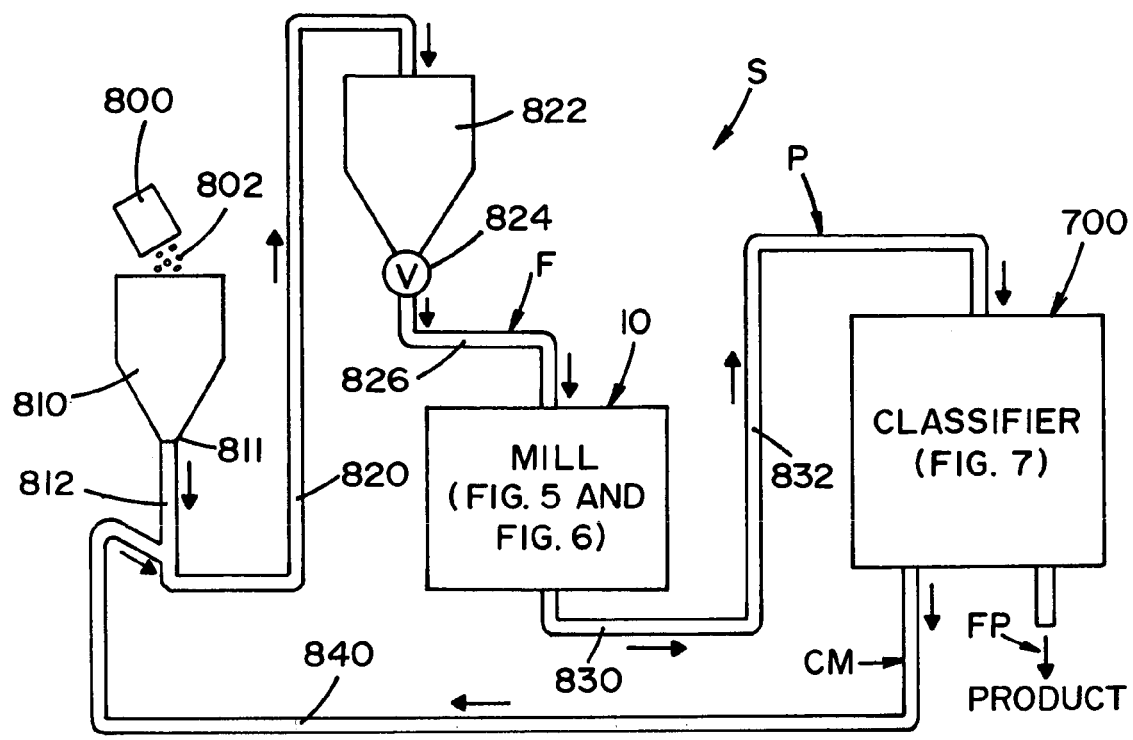
FIG. 8 is a layout drawing of the system used to perform the method constituting the present invention, which system combines a vertical stirred ball mill and the specific classifier as illustrated in FIG. 7.
Figure 6A:
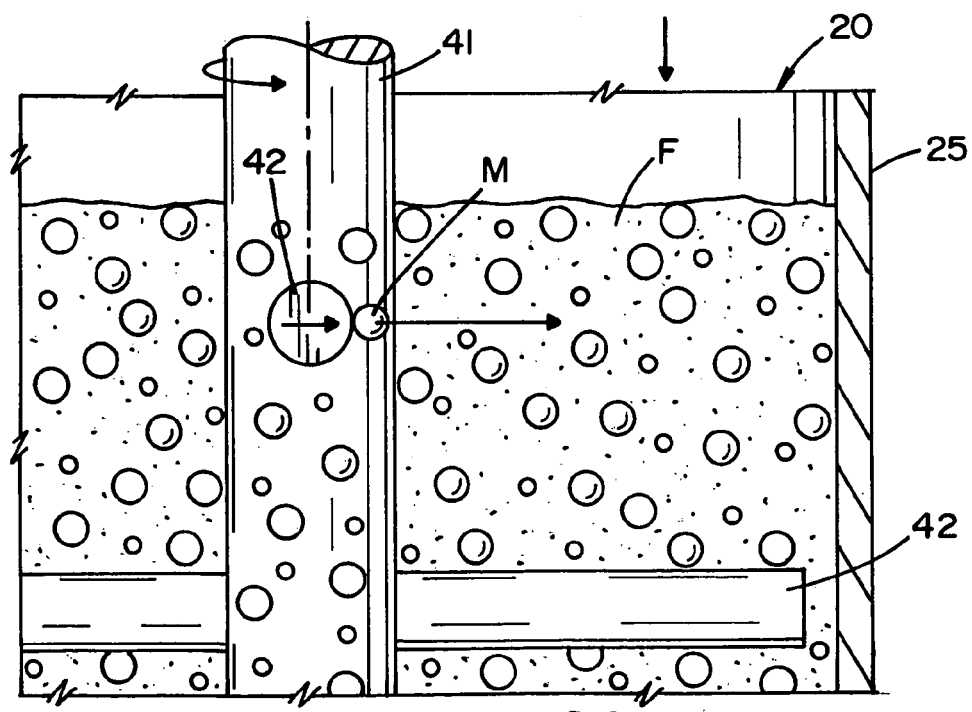
FIG. 6A is a schematic drawing of the dry grinding process used in the dry mill constituting the present invention.
Figure 7:
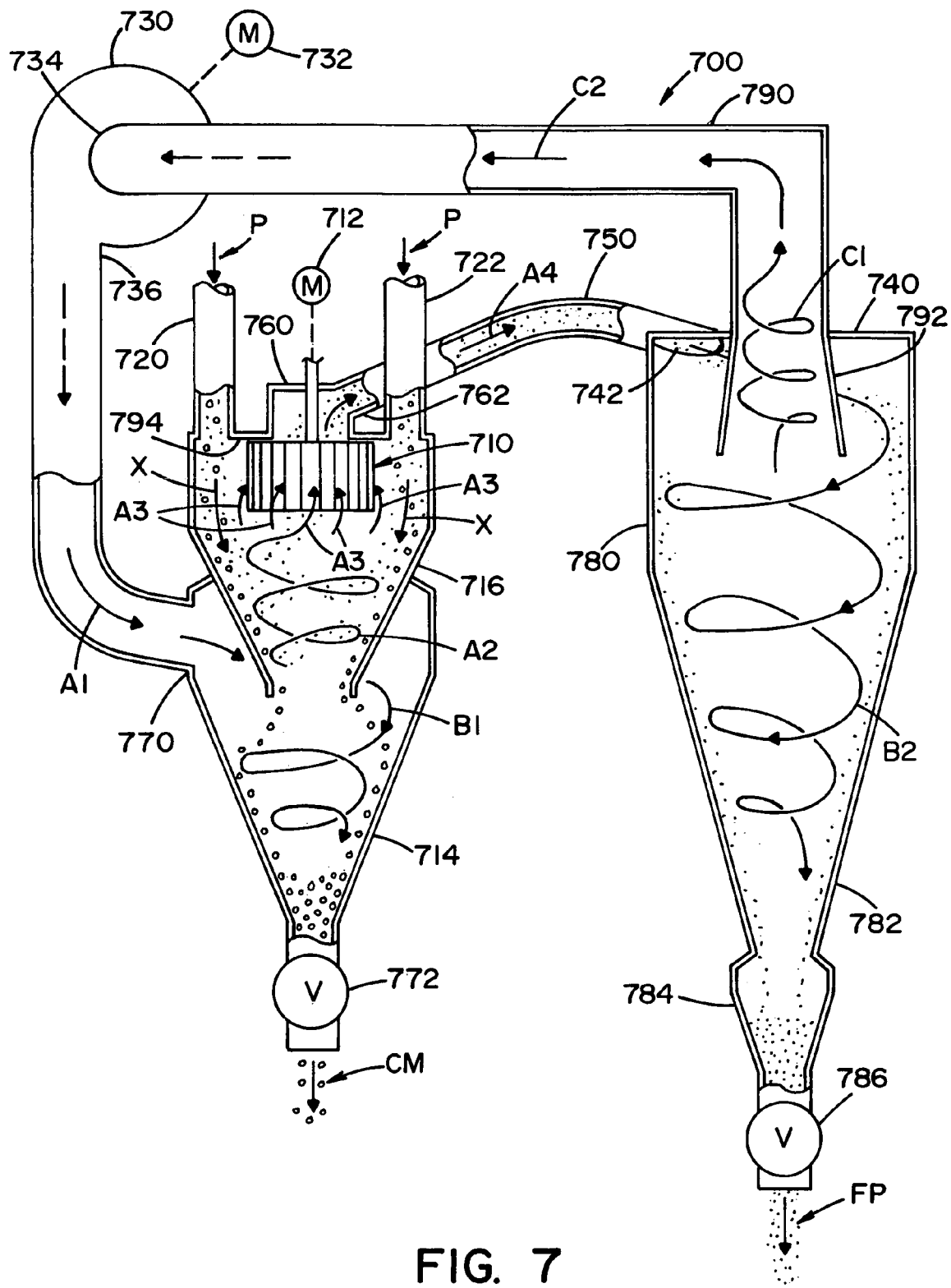
FIG. 7 is a side view of the air classifier used in the present invention to separate the finished product from coarse material contained in the intermediate powder exiting from the ball mill illustrated generally in FIGS. 5 and 6.

Method 100 as disclosed in FIG. 1 is a general disclosure of a method to make fine grain nepheline syenite by using an air classifier schematically illustrated in FIG. 2. This method is optimized and rendered highly efficient by the present invention which involves selection of a vertical, continuous stirred ball mill as shown in FIGS. 5, 6 and 6A. This specific type of dry ball mill is combined with the dual stage classifier, as shown in FIG. 7. This invention constitutes a unique method of using a specific dry ball mill and as a secondary concept the combination of the unique ball mill with a specific classifier. The method is performed by systems illustrated in the diagram of FIG. 8. The method using this system with specific parameters constitutes the invention and FIG. 8 illustrates the preferred implementation of the novel method. The invention is the discovery that a vertically operated dry ball mill of the stirred type when combined with a specific classifier, which is modified from the structure in English U.S. Pat. No. 4,885,832 (incorporated by reference herein) produces a high efficiency system to perform the inventive method that produces ultra-fine grain nepheline syenite product having a grain size which is less than about 5-6 microns. This product has drastically improved physical characteristics from nepheline syenite having larger particles and will be or is offered to end users by Unimin Corporation of New Canaan, Conn. under the trademark MINEX 12. The unique method of producing this drastically improved nepheline syenite product by a specific vertical ball mill and as a combination with a dual stage classifier constitutes aspects of the invention and the preferred embodiment of the invention is illustrated in FIGS. 5-8.

Vertically Operated Stirred Ball Mill

The ball mill used in the preferred embodiment of the present invention is of the type generally disclosed in Hagy U.S. Pat. No. 4,850,541 and Szegvari U.S. Pat. No. 4,979,686. These two patents are incorporated by reference herein as background information on a vertical stirred ball mill. The vertical continuous stirred ball mill constituting the primary aspect of the present invention is a high speed dry grinder generally indicated by the number 10 in FIGS. 5 and 6. This is a vertical stirred dry mill and includes a floor support plate 11 upon which is mounted a machine frame 10. The machine frame consists essentially of a horizontal base member 12a and opposed vertical legs 12b and 12c which are either integral with or welded to horizontal base 12a. Vertical leg 12b projects upwardly only a portion of the overall height of the machine and serves as support for pivotally mounting the commuting vessel, as will be described.

Mounted on one surface of vertical leg 12c is motor 13 and a mounting plate 13a therefor with a starter 14 and a mounting plate 14a for the motor. The usual push button controls 15 are also included on one face of leg 12c and are mounted on top of leg 12d in a pulley and belt mechanism (not shown) which is attached to motor 13 in conventional fashion to serve as a drive train for the agitator apparatus.

The structure just described has not been illustrated in great detail since it is to some extent well known in the art. Motor 13, when agitated by starter 14, drives the belt and pulley mechanism to impart rotary motion to the agitator shaft through an appropriate coupling and bearing for the purpose which will be described.

A comminuting vessel 20 is mounted, for selective pivotal movements, to legs 12b and 12c so that the entire vessel can be pivoted for access to the interior thereof. Only the pivotal mounting assembly 22 on leg 12b is illustrated together with operating handle 22a which is connected to a worm and gear with a shaft and trunnion connected to vessel 20. A similar shaft and trunnion attachment connects vessel 20 with leg 12c. However, vessel 20 is intended to be locked in stationary position during grinding and, to that end, a vessel locking handle 19 is used. The comminuting vessel 20 also has a removable lid 21 which is secured by clamps 23 to the body of the vessel and, adjacent its lower end, one or more discharge valve assemblies 50 are mounted on the wall of the vessel. Projecting inwardly from the top of lid 21 is a shaft guard cover 17 which covers the agitator shaft and shaft coupling of the agitator assembly. A feed chute 18 is also mounted on the top of lid 21 which has a suitable aperture so that selected feed stock can be deposited through the chute 18 into vessel 20.

Referring now to FIG. 6, comminuting vessel 20 includes body 24 having an inner cylindrical sidewall 25 and a bottom wall 26. As illustrated, the body is doubled walled as at 25a and 26a so cooling water can be introduced into the cavity thus formed through inlet and outlet ports 25b and 25c, respectively. Also mounted above mid-point on outer wall 25a are trunnions 27 for the pivotal mounting of vessel 20 on legs 12b and 12c. Lid 21 is received on the open end of the vessel and is secured by clamp 23. The lid has an opening 21a for receipt of agitator shaft 41 of the agitator assembly 40 as well as an opening in communication with feed chute 18. Shaft 41 has one end projecting above lid 21 and has a key way 41a. This end of the shaft is connected to a coupling which also is connected to the shaft and bearing of the pulley which is, in turn, connected to motor 13 as previously described with regard to FIG. 5. Shaft 41 may be rotated in a direction of arrow z. Such a connection is well known in the art.

Grinding media or elements M are like balls contained within vessel 20, which vessel is filled to a percentage. Selection of the media and its size will be described later and is a feature of the present invention. The media is agitated for grinding purposes by the agitator assembly including shaft 41 having a series of radially extending agitator arms 42 protruding through bores 41b and arranged in a series along the longitudinal axis of shaft 41 and ultimately arranged at 90° radial angle. In this embodiment of the stirred ball mill, each of the agitator arms is L-shaped and has a long leg 42a and a short leg 42b joined thereto by radius portions 42c and projected at substantially 90° therefrom. The arms or legs are preferably straight as shown in FIG. 6A. The long leg 42a also has one or more milled annular slots 42d at about the longitudinal mid point. As can be seen this embodiment of a stirred ball mill includes agitating arms 42 that are inserted through shaft 41 and are held in position by pins 43 received in annular mill slots 42d. Provision of a plurality of notches 41b make it readily apparent that the mixing arms 42 can be mounted and disposed so that the right angle legs 42b thereof can be extended toward the inner side wall 25a or away therefrom. In this particular embodiment of the stirred ball mill, the position of arms 42 is selected for the particular grinding operation. Although not necessary in practice, stirred ball mill 10 illustrated in FIG. 6 provides a series of diverter disks 44 on vertical shaft 41. These diverter disks each have a central aperture so that they are slid along shaft 41 and are disposed as shown in FIG. 76 in alternating relationships with regard to each pair of agitating arms 42. These diverter disks which may or may not be required are held in place on the shaft against axial movement by a series of saddle sleeve 45 disposed axially above and below each disk 44 and having radius notches 45a to fit about agitating arms 42.

The stirred ball mill as illustrated in FIGS. 5, 6 and 6A is intended to operate at high speed and, while it may be characterized as being of a dry variety of grinding device as set forth above the discharge will be continuous and to the side contrary to normal bottom discharge devices used in the past for dry grinding. The discharge is by virtue of centrifugal force imparted to the ground material. The end of the lower right hand corner of FIG. 6 illustrates screen 51 through which the ground material or intermediate powder P will pass to valve assembly 50 and discharge chute 50a. This explains the technical operation of a vertical stirred ball mill wherein feedstock is introduced into chute 18 and passes downwardly through media M to the discharge chute 50a so that agitating arms of whatever particular configuration desired can reduce the grain size profile of the feedstock as it exits from the ball mill. This dry process increases drastically the percentage of particles in the feedstock which are below a given particle size which in the invention is below 5-6 microns. The operating characteristics of the stirred ball mill used in practicing the invention and illustrated in the preferred embodiment is schematically illustrated in FIG. 6A. The grinding process involves rapid rotation of agitating arms 42 by shaft 41 which produces a dry grinding process whereby media M is agitated into a random state of motion called "kinemetric porosity". See brochure entitled *Dry Grinding Attritors*, incorporated by reference herein. A vertical dry stirred ball mill is also referred to as an "attritor." In the expanded condition of the media, the media and the particles of the feedstock F are free to move. They collide and impinge upon each other to thereby reduce the effective grain size of the feedstock as it moves vertically downward through vessel 20. Media M filled to a desired level in vessel 20 is propelled outwardly by agitating arms 42 toward cylindrical wall 25 causing an agitating dynamic kinetic grinding action which allows dry grinding of the vertically downward moving feedstock F.

In operation, the spacing of arms 42 from inner wall 25 is usually determined by the size of the grinding elements or media and the space will normally be from 4-7 times the ball or media diameters. The same spacing arrangement is maintained between the lowermost agitating arm 22 and bottom wall 26 of vessel 20. The desired results of the ball mill can be obtained where the diameter of diverter disk 44 are from 50% to about 83% of the diameter of vessel 20. These diverter disks which may or may not be used in the preferred embodiment of the invention maintain the outer cylindrical movement of feedstock F through vessel 20. They are not used in the mill of FIG. 6A. The dry grinding material in a stirred ball mill is typically between 5 mm and 13 mm. However, it has been found in performing the method of the present invention that the media will have a much reduced size such as less than 5 mm and preferably in the range of 2.0-2.5 mm.

The common speed at which shaft 41 is rotated in dry grinding is about 300-350 rpm with a 6.5 inch diameter agitating arm. The velocity of the arm is so great that the material has a tendency to form a straight cylinder during mixing. However, addition of diverter disk 44 breaks this up and diverts some of the material flow to the area between the disks to increase resonant time in the grinding chamber which ensures a finer grind. This concept is employed in the preferred embodiment of the present invention.

Stirred ball mill 10 shown in FIGS. 5, 6 and 6A is selected and operated on a specific feedstock as will be explained in practicing the preferred embodiment of the present invention. An aspect of the invention is the use of a vertical stirred ball mill in combination with a unique selected classifier shown in FIG. 7 and described in the next section.

In accordance with the invention, feedstock F has a maximum particle size greater than about 20 micron, and preferably in Minex 3 sold by Unimin Corporation of New Canaan, Conn. having a maximum grain size of 50-60 microns and a given amount of particles less than 6 microns. Mill 10 grinds feedstock F to produce more particles with a grain size less than 6 microns by shifting the particle size distribution toward smaller particles in the intermediate powder P directed to the air classifier illustrated in FIG. 7. See the particle size distribution of the final product and intermediate compounds in FIGS. 10 and 13.

Air Classifier

To practice the unique and novel invention for making ultra-fine nepheline syenite powder with a grain size less than about 6 microns, a general air classifier can be combined with stirred ball mill 10. However, a secondary aspect of the invention is to combine mill 10 with a specific two stage air classifier 700 as shown in FIG. 7. This side draft classifier has been selected and is employed. Air classifier 700 uses a rapidly moving high speed air stream moving along a defined path to convey intermediate powder P with an increased percentage of ultra-fine grain particles along the path, Classifier 700 allows coarse particulate material including particles larger than the ultra-fine product size to be separated by centrifugal force and gravity. This coarse material CM is then expelled from classifier 700. Two stage air classifier 700 employs a side draft air classifying mechanism generally of the type referred to in Saverse U.S. Pat. No. 4,551,241, which patent is incorporated by reference herein as background information. The side draft air classifier used in practicing the novel method of the present invention includes a vertical, tapered blade rotary rejector or cage 710 operated at high speed by motor 712. A lower expansion chamber 714 is communicated with the outlet of an upper, conical separation chamber 716. Motor 712 drives rejector 710 at an ultra high speed in the general range of 1200-1600 rpm to perform the particle separation process for air classifier 700. Rejector 710 is rotated at high speed as intermediate powder P is directed from the outlet chute 50a of mill 10, as shown in FIGS. 5 and 6 through one or more powder inlets 720, 722. Powder P flows downwardly in separation chamber 716 as indicated by arrows x. Consequently, the intermediate nepheline syenite powder P is directed into classifier 700 at inlets 720, 722 so air fan 730, driven by motor 732 at an ultra high speed in the neighborhood of 1400-1700 rpm, pulls exhaust or returned clear air through inlet 734 and force the air at ultra high speed through outlet 736. This ultra high speed air flow is used in separating the final product FP, which is nepheline syenite with a particle size of less than about 6 microns, from the intermediate nepheline syenite powder P as the air flow moves to powder in a selected path indicated in FIG. 7. The air path has several distinct functional portions. Air in path A1 is high speed generally clear air directed into lower expansion chamber 714 where it is caused to form a centrifugal vortex, illustrated as spiral path B1. Since expansion chamber 714 does not allow free exit air flow, the high speed air from path A1 must move upwardly along path A2 in separation chamber 716 which is a conical chamber above lower expansion chamber 714. At the upper portion of separation chamber 716 the air is driven into the high speed rotary rejector 710, as indicated by radial arrows A3. Rejector 710 separates the fine particles from coarse particles in the incoming intermediate powder P so that fine particles are carried from the rejector cage as indicated by air movement A4. In this manner, side draft air classifier 700 directs separated material along path A4 to the final stage separator 740 of classifier 700 by way of inlet 742. The particulate size profile of intermediate powder P is substantially greater than the particulate material profile of the nepheline syenite powder carried in air flow A4. This profile has a 99.9% of its particles less than 6 microns. This is the definition of particle size that is obtained through the mill 10 in FIGS. 5 and 6 and air classifier 700 in FIG. 7. Air flow A4 carrying particles of the desired size from rejector cage 710 passes through conduit 750 which is communicated with the upper rejector hood 750 at hood outlet 762.

Two stage air classifier 700 is of the type shown in Saverse U.S. Pat. No. 4,551,241 and is essentially divided into a first stage where high speed air is directed by way of inlet 770 to expansion chamber 714. In the expansion chamber, the air must move upwardly through separation chamber 716 for processing by rejector cage 710; however, a certain amount of air is diverted from the main air path as indicated by air flow B1 in the expansion chamber 714 which causes coarse material CM to be deposited in the lower portion of expansion chamber 714 for subsequent conveyance through a rotary valve and air lock 772. In the first stage of operation, high speed air flows into the lower expansion chamber 714 and then upwardly into separation chamber 716 with a slight amount of air forming a vortex as indicated by air flow B1 to direct large particles greater than the ultra fine product to be selected so that centrifugal force and gravity moves the coarse material CM downwardly through valve and air lock 772, as shown in FIG. 7. At the same time, intermediate powder P is carried by air flow A2. Radial air flow streams A3 force the particles of powder P through rejector cage 710 to produce the ultra fine product of the present invention in conduit 750. Final product FP is carried by air flow A4 to separator 740. In this manner, coarse material is separated from the desired ultra fine grain nepheline syenite powder that passes into the second stage or final stage separator 740 of classifier 700. Separator 740 has an upper housing 780 and a conical down draft portion 782 that creates a fine product high efficiency collector cyclone indicated by spiral arrow B2. Housing 780 is conical and converges on a lower expansion chamber and catch hopper 784 for receiving the fine product separated from intermediate powder P. Rotary valve and air lock 786 directs the final product FP from the second stage of classifier 700. In summary, intermediate powder P is processed by two stage air classifier 700 operated by a high speed rejector cage 710 and a high speed air flow inducing fan 730. The classifier then divides the incoming intermediate powder into a coarse material CM and an ultra-fine grain nepheline syenite powder having a grain size of less than about 6 microns as a final product FP. To complete the air flow between the two stages of classifier 700 there is provided a clear air return duct 790 communicated with a conical return hood 792 extending downwardly into separator 740 so that clear air from hood 792 is withdrawn from the separator in an initial torsional path C1 that transitions into a linear return air path C2. Consequently, clear air is separated from product FP and returned to air inlet 734 of high speed air fan 730. In practice, there is provided a micro seal 794 between the upper hood 760 of high speed rejector cage 710. In this manner, air classifier 700 separates the final product FP from the coarse material CM after mill 10 reduces the particle profile of the nepheline syenite feedstock F into a shifted particle size profile for intermediate powder P. Powder P has more particles less than 6 microns in size than the incoming feedstock F of mill 10. Air classifier separates the powder P into final product FP and coarse material CM.

The two stage centrifugal air classifier 700 is a Micro-Sizer from Progressive Industries as shown generally in Saverse U.S. Pat. No. 4,551,241. This classifier comprises a main classifying chamber with a vertical blade rotor "rejector" and a lower expansion chamber in which particles are suspended in air for classification by the rejector. Rejector or rejector cage 710 operates at a high speed. The higher the speed the finer the particles that can pass through the rejector as a final product. The coarse material CM eventually drops out of the bottom of the expansion chamber. A separate cyclone is used to collect the fine product that pass the rotor rejector cage. The system is sealed for the purpose of recovering a higher percentage of available fine particles than is customary for most air classifiers. The classifier is specifically operated at speeds designed to make cuts as low as 5-6 microns and requires no dust collection.

Inventive Method

The present invention relates to a method for converting nepheline syenite particulate feedstock F with a grain size profile having a maximum grain size of at least 20 microns to an ultra-fine finished product FP for subsequent commercial use. The fine grain final product FP has a grain size of less than 6 microns and is obtained by providing a dry feedstock with a particle size greater than about 20 microns and, indeed, greater than about 60 microns. This method is performed by the system S, illustrated in FIG. 8. Feedstock F is passed downwardly in a vertical direction through continuous, high speed stirred ball mill 10 as schematically depicted in FIGS. 5 and 6. The dry ball mill has stirring arms rotated at a selected high speed in a vertically extended chamber filled with a grinding media so the feedstock F is ground into an intermediate powder P by action of the media as the media is moved laterally at a high speed by the rotating stirring arms as explained in connection with the showing in FIG. 6 and in the brochure entitled *Dry Grinding Attritors*. Intermediate powder P has a drastically reduced grain size profile than the grain size profile of feedstock F. The intermediate powder is then passed through classifier 700 as shown in FIG. 7, which classifier uses a rapidly moving high speed air stream passing in a given selected path to convey ultra fine grain material comprising final product FP along the path and then from the classifier. The classifier allows coarse particulate material CM, including particles larger than the targeted size of the particles in the ultra-fine product to be separated by centrifugal force and then expelled from classifier 700. In this manner, ultra-fine product FP is collected and coarse material CM is returned to the high speed ball mill 10 for regrinding. Classifier 700, in the preferred embodiment, is a two stage air classifier as shown in Saverse U.S. Pat. No. 4,551,241 with a first stage to separate the coarse material and a second stage to remove dust from the final product. The dust laden air includes particles less than about 1 micron and is generally "clean air" that is returned to the fan of the classifier. The feedstock has a particle size wherein 99% of the particles are greater than about 50 microns. In practice, 99.9% of the feedstock F is less than about 60 microns. The average D50 particle size of feedstock F is about 10-11 microns. The media particle size in mill 10 is generally less than 5 mm and preferably in the range of 2.0-2.5 mm. The media hardness is about Mohs 9. Indeed, the media is ceria-stabilized zirconium oxide although other stabilized forms of zirconium oxide and aluminum oxide and tungsten carbide have been used. The media of the mill is filled to about 50-80% of the chamber, and preferably about 70%.

The novel method is performed by system S as disclosed in FIG. 8 and including stirred ball mill 10 and an air classifier, which is preferably side draft classifier 700. Combination of the dry stirred ball mill and air classifier has already been disclosed in detail. System S has a feedstock supply 800 which is generally incoming bags of nepheline syenite powder with a D99 grain size of about 60 microns. In practice this feedstock is Minex 3 sold by Unimin Corporation of New Canaan, Conn. New nepheline syenite material 802 is directed to hopper 810 from which it is directed by output valve 811 to mill feed line 812. The feedstock is directed to input conveyor 820 which, in practice, is a bucket elevator that deposits the feedstock into mill hopper 822. Control valve 824 directs the feedstock onto mill input conveyor 826 so that the feedstock is conveyed to inlet chute 18 of mill 10, as shown in FIG. 6. Intermediate powder P, which is nepheline syenite powder having a drastically reduced grain size distribution from the grain size distribution of feedstock F exits from discharge chute 50a of mill 10 as shown in FIG. 6. Intermediate powder P is directed through conveyor 832 which is also a bucket elevator to deposit intermediate powder P into the upper inlets 720, 722 of air classifier 700, as shown in FIG. 7. In system S, material CM is returned by conveyor 840 to direct the oversize material from classifier 700 to mill feed line 812 to be combined with the new material 802 to form feedstock F for grinding in mill 10. Thus, feed stock F is the new material from line 812 and the return material from conveyor 840. The method of the present invention is performed by system S as shown in FIG. 8 using the stirred ball mill 10 of FIGS. 5 and 6 and the specific air classifier shown in FIG. 7.

Parameters and Data of Inventive Method

System S of FIG. 8 is assembled and operated to produce a nepheline syenite final product having a grain size of less than about 6 microns, which indicates that D99.99 is less than about 6 microns. The method involves selecting a downward flow stirred ball mill and an air classifier, specifically a two stage side draft air classifier operated as previously described and as set forth in the appended claims. In practice, the stirred ball mill is the High Speed Attritor Model HSA-100 from Union Processing, Inc. of Akron, Ohio. This mill is a continuous high speed stirred ball mill in which the product is discharged through a gate designed to retain media M as represented in FIG. 6A. The 85 gallon mill is stirred by means of a 24 inch diameter assembly at about 300 rpm. The 150 horsepower motor can draw up to 190 amperes. The mill shell has a water jacket to moderate the high temperature generated during the milling operation. In accordance with the invention, media M has been selected to include ceria-stabilized zirconium oxide ("Ceria" with a particle size less than 5 mm, but preferably in the range of 2.0-2.5 mm). The selected media has a hardness of Mohs 9 which is substantially harder than media heretofore used in such a device. The side draft air classifier preferred for use in practicing the present method is the Micro-Sizer Model MS-10 from Progressive Industries of Sylacauga, Ala. The Micro-Sizer as shown in FIG. 7 comprises a main classifying chamber with a vertical blade rotor "rejector" or rejector cage 710 and a lower expansion chamber 714 in which particles are suspended in air for classification by the upper rejector. The rejector operates at high speed which in accordance with the invention is in the range of 1200-1600 rpm and preferably 1300-1600 rpm. This extremely high rotating speed for the rejector has been found necessary to produce the fine grain product in accordance with the present invention. The high speed air stream in classifier 700 is produced by increasing the fan speed to an ultra high level in the range of 1400-1700 rpm and preferably 1500-1700 rpm. Coarse material CM eventually drops out of the bottom of the expansion chamber. In the second stage of classifier 700 there is a separate cyclone that is used to collect the final product that passes through the rotor or rejector of the side draft classifier. In accordance with a secondary aspect of the invention, the upper portion of the rejector is sealed by a micro seal 794 between the high speed rotating rejector and outlet hood 760. By selecting this type of side draft air classifier, it has been found that the method of the present invention is performed and requires no dust collection. The system S shown in FIG. 8 illustrates the movement of various nepheline syenite material between mill 10 and air classifier 700. The classifiers coarse material CM is returned back to mill 10 by means of screw conveyors and bucket elevators. In the disclosure, when a bucket elevator is employed in practicing the invention, the conveyor is so identified. The rest of the conveyors are normally screw conveyors. The exposed parts of the mill, classifier and conveyor equipment are all produced of 304 stainless steel.

In the analysis of the invention as herein described, particle size was determined with a Malver Master Sizer Laser Defraction Instrument. Color was analyzed with a Minolta CM-3600d. The color readings are L*, a* and b*. Using the measurements of the present equipment, a D98 value of about 5.60 and a D50 value of 1.85 was realized for final product FP when performing the novel method. Nepheline syenite feedstock F used in practicing the invention was Minex 3 which has a grain size less than 60 microns. Indeed, the feedstock used in practicing the invention had a D98 at 61.49 and D50 at 10.60. The color measurements were L* 96.20, a* 0.05 and b* 1.45. This feedstock was processed by the system S disclosed in FIG. 8, which system was used to perform the novel method and resulted in nepheline syenite having the characteristics and parameters set forth in the table of FIG. 9. In practicing the invention, a unique media was used. Ceria stabilized zirconia was found to perform as well as zirconium silicate while causing less discharge grate binding. Zirconia and zirconium oxide stabilized by Ce was found to be preferred. The grinding aid normally used with the feedstock in a stirred ball mill to increase the flowability of the feedstock through the media is diethyl glycol (DEG) In the present invention it was found that the grinding aid universally used in a mill such as mill 10 was not required to improve size reduction or facilitate discharge; however, the use of a grinding aid affect the coloring of the final mill product, especially if the dosage was increased. Thus, one aspect of the invention is the reduction of grinding aid. Indeed, grinding aid in accordance with one aspect of the invention is not used at all in mill 10. The air classifier in practice uses a rotor or ejector speed of 1450-1500 rpm. It has been found that this range is preferred; however, the range has been adjusted between 1200 and 1600 rpm, but preferably between 1300 and 1600 rpm. Regarding the grinding aid dosage, it has been minimized. Indeed, in a limited aspect of the invention, the aid is discontinued since it has been found that excessive dosing of grinding aid has agglomerated the material coming from the mill thereby undermining the efficiency of the air classifier.

Figure 10:
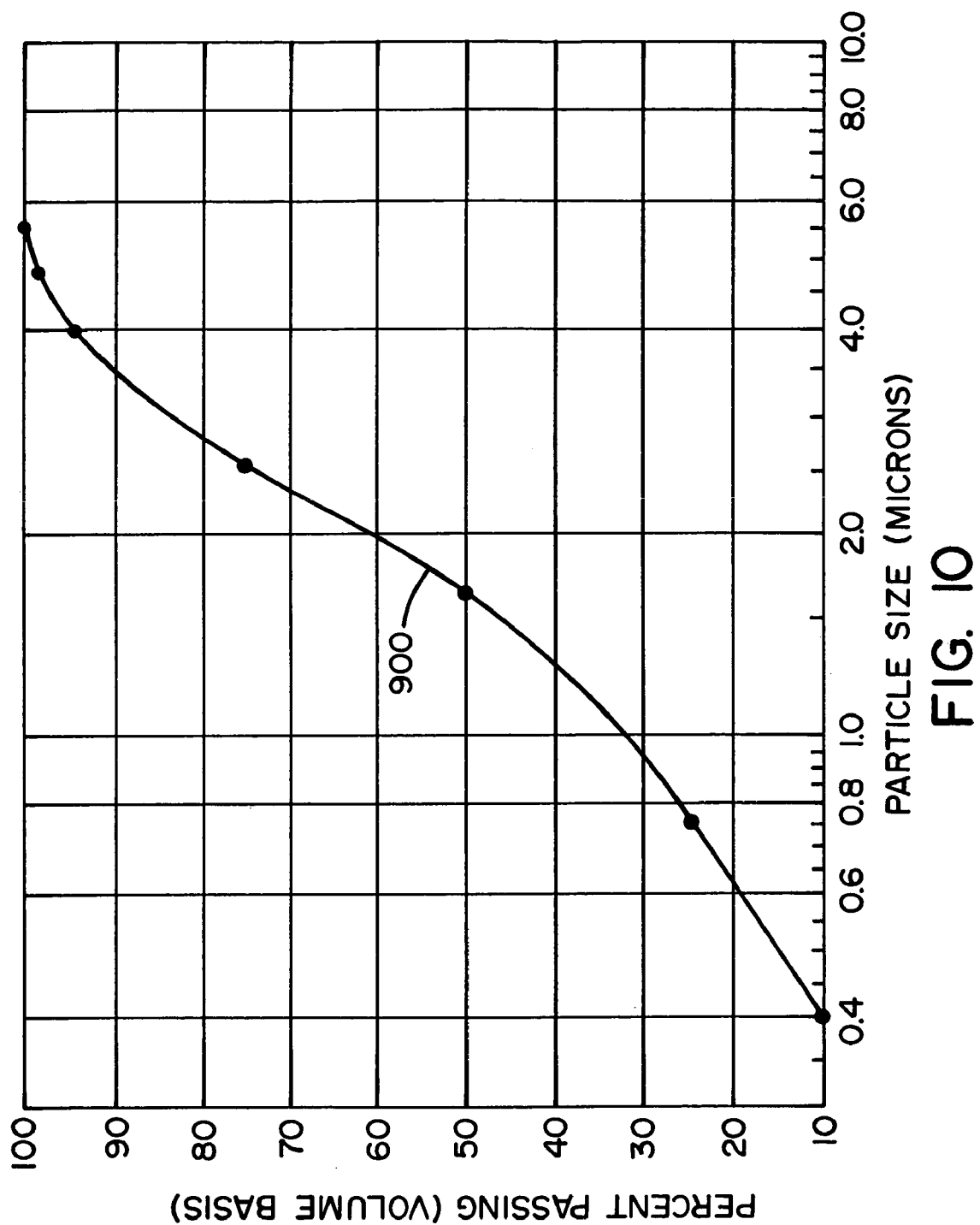
FIG. 10 is a graph representing the particle size distribution of a nepheline syenite product processed by the present invention.

Operating the system S of FIG. 8 in accordance with the parameters of the present invention as so far described and as described later produces a finished product having a particle size distribution as schematically represented in log graph in FIG. 10 and the table in FIG. 11. FIG. 9 summarizes the mill and air classifier conditions for practicing the novel method. This particle size distribution illustrates that the maximum grain size is a ultra-fine value of less than 6 microns when considered at the D99 number of FIGS. 10 and 11. Curve 900 on the log scale shows that the minimum grain size is about 0.4 microns and the maximum grain size is about 6.0 microns with D50, the measurement of efficiency, being 1.65 which is close to the target of 1.85. The efficiency of the classifier in accordance with standard practice is the D50 number divided by kw-hr over metric tons. Consequently, the D50 number determines the efficiency of the classifier as it relates to the amount of energy per metric ton. The particle size distribution (PSD) for the final product produced by the novel method of the present invention targets D98 at 5.60 microns and D50 at 1.85 microns. As can be seen in FIG. 10, graph 900 shows that the method produces a final nepheline syenite produce where D98 is substantially less than the target amount or about 4.5 microns. This particle size is still within the desired PSD in the final product, which product has the basic requirement of a maximum grain size of less than 6 microns. The table of FIG. 12 reports the brightness results obtained by processing nepheline syenite having a maximum particle size of about 60 microns by using the present invention. These color values were obtained by using the MacBeth Color Eye 3000. The product made by the present invention in this example had a lower brightness than subsequent uses of the present invention wherein the grinding aid was removed. The final product FP represented by the table of FIG. 11 and the table of FIG. 12 has been used in several powder coating formulations and has been found to represent the properties associates with nepheline syenite powder having a grain size of less than 6 microns. In the use of the method reported in FIGS. 10-12, the PSD was quite stable and the productivity was generally about 80 kg/hr or 0.08 metric tons/hour. Indeed, several production runs of the product so far described has established that runs slightly less than 100 kg/hr are sustainable.

Figure 13:
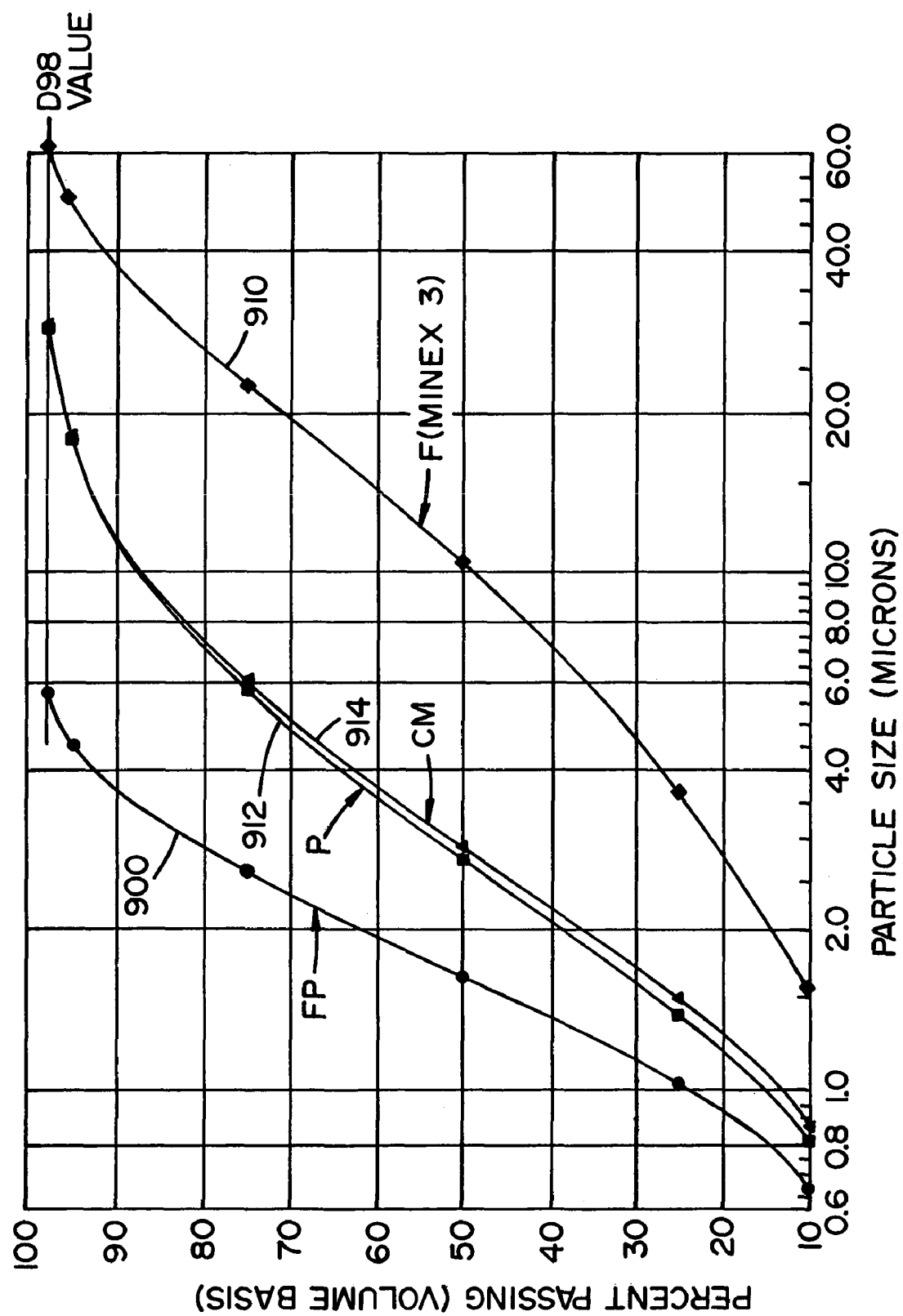
FIG. 13 is a graph showing the particle size distribution of the nepheline syenite material at various stages in the method performed by the system disclosed in FIG. 8.

The efficiency of the method is primarily a function of the operation of the air classifier and not the stirred ball mill 10 of FIG. 5. Thus, the operation of the air classifier was analyzed for the purposes of determining efficiency of the total method of the present invention. It was found that the air classifier shown in FIG. 7 was highly efficient in removing coarse material with a grain size of less than 6 microns so that final product FP was a nepheline syenite with essentially only particles less than 6 microns as shown in FIG. 10. However, the air classifier was less efficiency at removing fine particle sizes less than 6 microns from the coarse stream of a classifier. Consequently, the PSD of the mill return or coarse material CM was only slightly coarser than the intermediate powder P to the air classifier. This phenomenon is revealed by the operating characteristic of the mill and air classifier used in practicing the present invention as schematically shown in the graph of FIG. 13 and the table in FIG. 14. Curve 900 in the graph of FIG. 13 represents final product FP as shown in FIG. 10. The PSD feedstock F is illustrated by curve 910. This material is directed to mill 10. The output of the mill is intermediate powder P used to generate PSD curve 912. The return material or coarse material CM generated the particle size distribution curve 914. As shown in FIG. 13, the incoming feedstock has a particle size of less than about 60 microns. Final product FP has a particle size distribution shown as curve 900. The coarse material returned and the output of the mill has substantially the same particle size distribution curve with a maximum grain size generally about 30 microns. Thus, the particle size distribution of the mill return is only slightly coarser than the powder provided to the air classifier from the mill. This reveals that the air classifier removes only a small portion of the material from the mill which small portion has a grain size of less than about 6 microns. Consequently, the air classifier shown in FIG. 7 and used in practicing the invention is not efficient in removing small particle sizes to leave a coarse material for regrinding by mill 10. This air classifier performance data is set forth in the table shown in FIG. 14. The oversize efficiency of the air classifier is about 98%. The under size efficiency averages about 13%. This confirms that the air classifier produces a PSD as shown in FIG. 10. Removal of the product size particles from the incoming intermediate powder P from the mill is effective. This therefore results in the desired particle size distribution for the final product. However, to improve the undersize removable efficiency of the inventive method, adjustment has been made to the air classifier in accordance with information obtained from several runs at different fan speeds and rejector rotary speeds set forth in the curve of FIG. 15. The runs reported in the chart of FIG. 15 records the speed of fan 730 as curve 920. Section 922 of curve 920 involves a fan speed of 1700 rpm. The fan speed is reduced to a speed of about 1550 rpm as indicated by section 924 of curve 920 and then reduced to a speed of about 1450 rpm as indicated by section 926. As the speed of the fan is adjusted between sections 922, 924 and 926, the speed of the rotary rejector cage is also adjusted as shown by curve 930. The rotor speed is adjusted between about 1300 and 1500 in sections 922 and 924 of the fan speed curve 930. The fan speed of section 926 was usable if the rotor speed was above about 1350 rpm. These adjustments over sections 922, 924 and part of 926 resulted in the production rate illustrated by graph 940. From the run graph shown in FIG. 15, it has been determined that the speed of the fan and speed of the rotor are instrumental in increasing the productivity of the air classifier. The increasing of productivity while maintaining the D50 of the particle size distribution for the final product FP determines the efficiency of the air classifier which efficiency is basically the overlying efficiency of system S shown in FIG. 8. The rotor speed of the air classifier is greater than has been heretofore employed and involves about 1200-1500 rpm and preferably 1300-1500 rpm. At the same time, the fan driving the air for the classifier is also increased to the general range of 1400-1700 rpm and preferably in the range of 1500-1700 rpm. By maintaining the fan speed of curve 920 generally fixed, the rejector rotor speed is manipulated to obtain the desired efficiency. Manipulating the rotor speed is successful in meeting the product size specification, but does not increase productivity of the process. Consequently, to increase productivity the air fan speed was reduced as shown in section 924 of the curve 920 in FIG. 15. This decrease in fan speed reduced the resistance of the product size particles as they passed through the rejector rotor. Thus, the high fan speed is held fixed and the rotor speed is manipulated to determine the particle size distribution of the final product. Productivity is a combination of the two speeds associated with the air classifier as shown in FIG. 15.

In summary, it has been found that the rotor speed and air fan speed are factors controlling productivity and their values are determined while maintaining a high rotor speed for separating the desired small particles from the incoming intermediate powder P of the air classifier.

As discussed previously, a stirred ball mill involves the use of a grinding aid to increase the flowability of the feedstock through the media. In performing the present invention, the grinding air dosage was reduced to a minimum for several reasons. When using a hard media as in the present invention, the grinding aid had no positive impact on the grindabilities or the ability of the nepheline syenite to pass through the mill discharge gate or screen. However, the grinding aid had a noticeable negative effect on brightness of final product FP. Furthermore, excessive grinding aid caused particles to agglomerate and thereby reduce the undersize efficiency of the air classifier as discussed in connection with the table in FIG. 14. Using the same grinding aid dosage as employed in prior method of operating mill 10, it was found that the level of grinding aid was many times greater than would be thought essential in slow through put of nepheline syenite feedstock through mill 10. Consequently, the present invention can be performed with the grinding aid turned off. The method without using a grinding aid was not adversely affected and the brightness of the final product was substantially increased. However, there was a decrease in the flowability in the screw conveyors between devices. A grinding aid has been shown to help remove fines and reduce plugging at the discharge gate. Thus, to decrease the flow resistivity in the conveyors, a minimum amount of grinding aid was used, such as 50 ml/min, with the advantage mentioned. The range for excellent results in this area was 50-150 ml/min, but preferably 50 ml/min.

Controlling the rejector motor speed, air fan speed and grinding aid was done to increase efficiency of system S. These efforts developed certain parameters in such areas as so far described; however, these parameters can be adjusted and manipulated to obtain the desired end result for producing final product FP by the system shown in FIG. 8. It has been determined that the rejector rotor speed should be in the range of 1200-1600 and preferably in the range of 1300-1600 rpm which is drastically higher than heretofore used in mill 10. The air flow for producing product FP is somewhat reduced from standard practice and is in the general range of 1400-1700 rpm and preferably 1300-1500 rpm. Grinding aid is reduced to increase brightness of the final product. It has also been determined that a huge factor affecting oversize removal efficiency as reported in table 14 is the relative humidity within the classifier. In accordance with an aspect of the invention, the relative humidity in the air classifier is controlled to improve overall efficiency of the method constituting the present invention while not rendering the milling and classifying of the method outside the "dry" designation.

Statements of Invention

The grinding in stirred ball mill 10 is dry to generate the desired shift in the particle size distribution (PSD) or profile of intermediate powder P. The efficiency of the air classifier is increased by a controlled level of humidity. Thus, the inventive method is broadly dry grinding of the feedstock with an outlet air classification operation wherein the air classification has a controlled level of humidity. In accordance with the invention the dry mill is a stirred ball mill with or without a specific air classifier. As a secondary feature the air classifier is a side draft air classifier as shown in FIG. 7, with or without humidity control. Combinations and permutations of these features constitute definitions of the novel method and statements of invention.

Test of Inventive Method

Using the information, parameters and data as so far explained, sixty-one test runs were conducted for performance of the novel method using system S shown in FIG. 8. The summary of the results of the sixty-one tests all are set forth in the table of FIG. 15. From this table, the rotor speed is adjusted between 1200-1600 rpm.

Although the speed of rejector 710 in practicing the preferred embodiment of the invention is in the range of 1200-1600 rpm, preferably the range is 1450-1500 rpm.

The air fan speed is adjusted between 1400-1700 rpm. The production through the mill is about 80 kg/hr so the average rotor speed is generally 1400 rpm and the average fan speed is generally 1600 rpm. The invention is best performed by using the average feed rate and disclosed operating speeds of the air classifier. As can be seen, the grinding aid dosage and feed rate is adjusted as is the water for the cooling rate through the water jacket of the third ball mill 10. The particle size distribution obtained during these same six operations is set forth in the table of FIG. 16 and the mill return particle size distribution is set forth in the table of FIG. 17. The mill exit particle size distribution is set forth in the table of FIG. 18. These tables report the results of the various tests conducted using the present invention to show its ability to produce nepheline syenite with an ultra-fine grain size of less than 6 microns using the parameters as disclosed in the table of FIG. 15.

In summary of the method comprising the present invention, nepheline syenite product having a grain size of less than about 6 microns is produced. The grinding of the feedstock operation of the invention is accomplished by continuous high speed stirred ball mill in which the product is discharged through a grate designed to retain the grinding media in the mill. The mill has a water jacket to moderate the high temperature generated during the milling operation. Tests have been conducted as reported earlier. These tests, and further tests, have been conducted on the novel method to determine the media, type and size, the media fill level, the rate of feedstock through the mill, the rate and dosage of the grinding aid, if any, and the discharge grate opening. Particle size distribution (PSD) and product brightness as reported before has been analyzed with respect to grinding efficiency, which is the percentage reduction in D50 divided by kw-hr per metric ton. The grinding efficiencies were calculated together with the other parameters used in practicing the invention with the result that the following determinations and findings were made. Ceria-stabilizer zirconium oxide is better media for the nepheline syenite than zirconium silicate that is normally used in a stirred ball mill. The Ceria media did not fragment and it did not contaminate the nepheline syenite. The grinding efficiency was largely insensitive to the range of media fill levels and grinding aid dosage; however, the efficiency increased substantially with feed rate and as the discharge opening or slot was reduced in size to increase the resonant time of the feedstock in the media. It was found that reducing the grinding aid dosage increased the brightness of the final product. Indeed, it was determined that it was possible to eliminate the use of grinding aid as one feature used in practicing the present invention. The use of a grinding aid in slight amounts improved operation of the air classification, but not necessarily the grinding efficiency of the mill.

The above discussion concentrated on the operation of air classifier 700 as shown in FIG. 7 as it relates to final product FP produced by the novel method using system S of FIG. 8. Certain details of the milling condition also has been determined for defining the present invention. The Union Process HSA-100 stirred ball mill had the characteristics of a mill volume 85 gallons. The stirrer speed was about 400 rpm. The mill liner and stirrer assembly is constructed from 304 Stainless steel. The operating parameters for the mill as it performed the present invention to produce fine-grain nepheline syenite powder having a hardness of Mohs 6 were determined. Zirconium oxide media was used. This media has a hardness of Mohs 9 and a specific gravity of 6.0. The media size was 2.2-2.4 mm. The fill level was 50-80% and generally about 70%. The feed rate was 5-2.3 kg/min. The stirrer had a rotary speed of 300 rpm. The mill discharge opening was in the range of 0.5-1.5 mm and preferably 1 mm and the grinding aid was less than 1.6% Diethyl glycol. These characteristics were used in practicing the present invention using the mill generally described with respect to the input side of system S shown in FIG. 8. The grinding aid is helpful in material flow through the discharge gate of the mill and in the air classifier instead of actually accelerating the grinding operation of the mill. The grinding media selected for practicing the invention also prevented backup in the discharge gate of the mill. The degree of size reduction of the nepheline syenite powder by the mill was affected by the mill rate, the media fill and the discharge plate opening. All of these parameters have been heretofore described in connection with their use in the practice of the present invention.

The size reduction occurring in the mill changes the feedstock PSD profile to the grain size or PSD profile of intermediate powder P. See FIG. 13. This shift to a lower profile by the mill is enhanced by increasing the feed rate using a fill level of 70%. When the feed rate was increased to 2.0 metric tons per hour with a fill level of 77% for the media the size reduction of the profile between feedstock F and intermediate powder P was increased. Furthermore, size reduction in the PSD actually improved as the media level and feed rate were increased proportionally. The discharge plate at the gate opening of the mill controls the resonant time of the feedstock and, thus, the amount of particle size reduction by the mill. It has been found that a grate with an opening or slot should be in the range of 0.5-1.5 mm; but a slot size of 1.0 mm is preferred.

The feedstock in operation of the invention had a maximum grain size of about 60 microns and contains about 25% of particles under 5 microns. In the intermediate powder P, 35% to 40% of the particles are less than 5 microns. Consequently, passage through the mill produced about 40-60% additional particles with a grain size of less than about 5 microns. Testing of the mill used in practicing the invention resulted in a determination of the fill level, feed rate and discharge plate opening value as set forth above. Reduction in the amount of grinding aid seemed to increase the size reduction in the mill. As shown in FIG. 13, the mill merely grinds the feedstock to produce a PSD profile with a higher proportion of fine particles. Consequently, nepheline syenite with a maximum particle size of about 60 microns in the feedstock F has a certain amount of particles of less than 6 microns. After the feedstock passes through the mill, the maximum particle size is about 30 microns and a greater amount of particles less than 6 microns is contained in intermediate powder P. Thus, the mill shifts the PSD to a smaller grain size profile.

Figure 19:
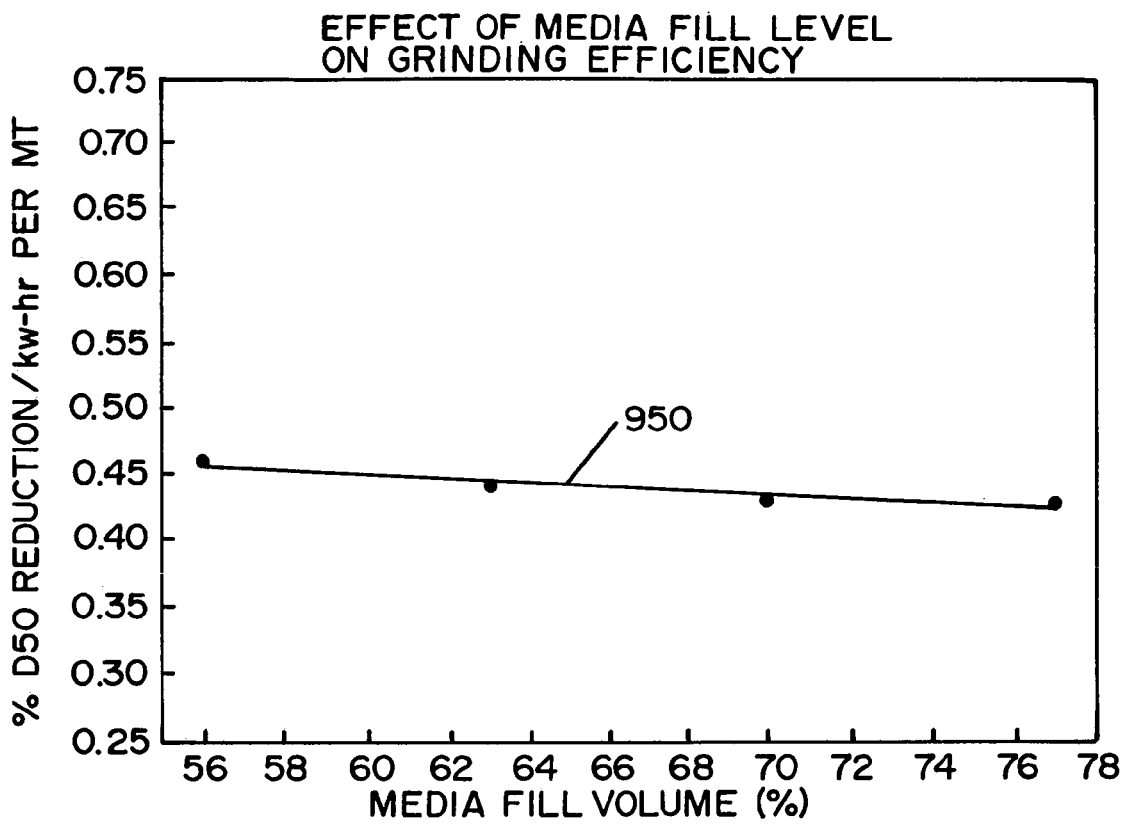
FIGS. 19-24 are graphs illustrating characteristics of the continuous, high speed stir mill forming the basic aspect of the present invention.
Figure 20:
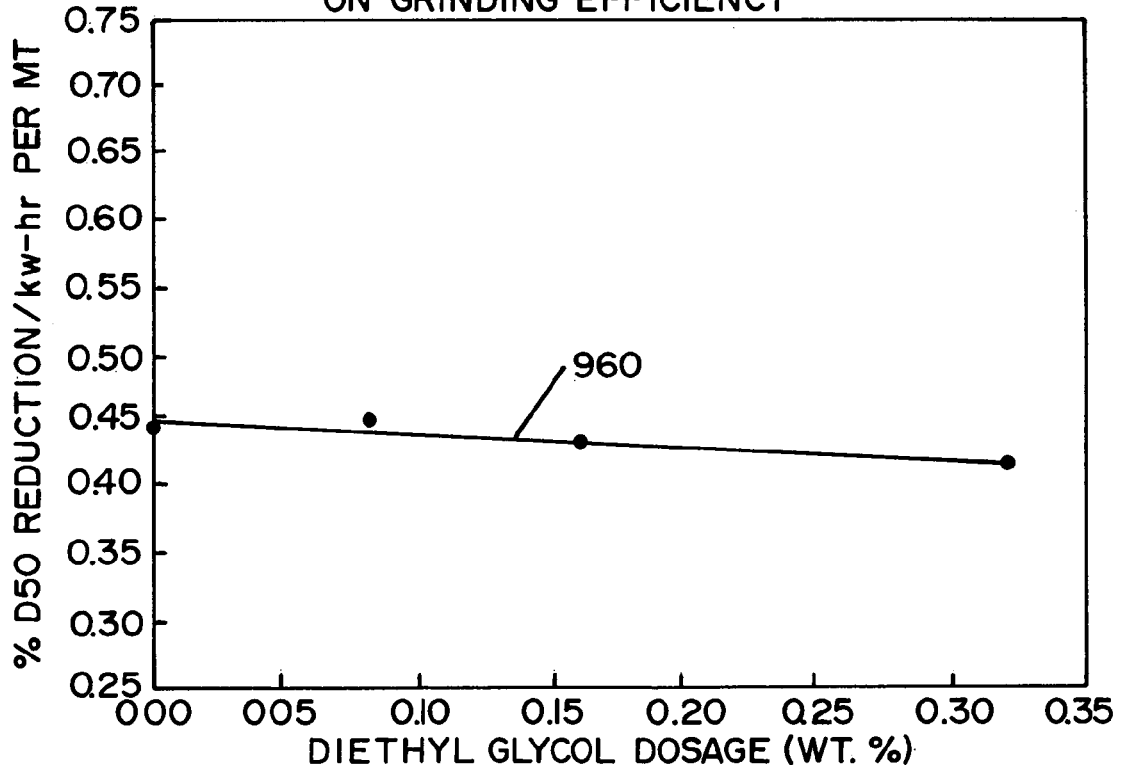
Figure 21:
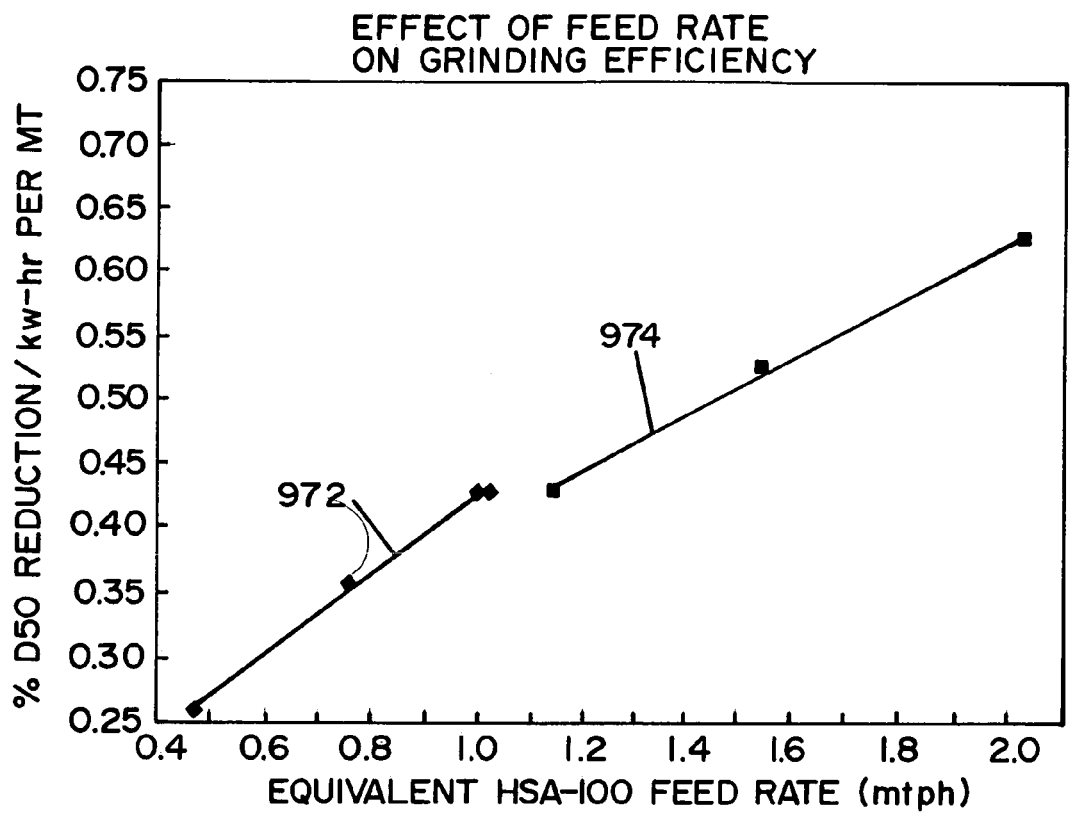
Figure 22:
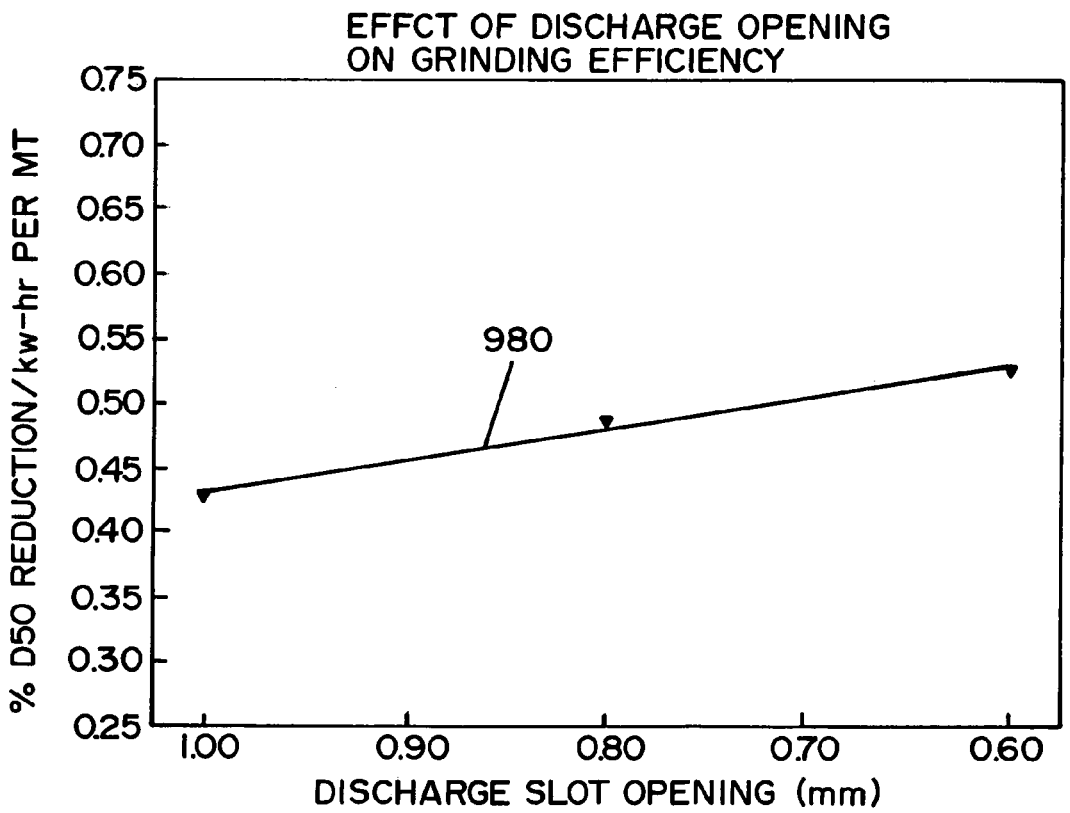

The range of grinding efficiencies obtained when practicing the present invention range from a low of 0.25 to a high of 0.65. FIGS. 19-22 show operating factor affecting grinding efficiency in the percent reduction of D50 per kw-hr/MT. These graphs compare the relative effect on efficiency of certain parameters used in operating the ball mill to reduce the particle size distribution or profile of feedstock F. In FIG. 19 curve 950 shows that the grinding efficiency is largely insensitive to the media fill level when the ratio of feed to media fill level is constant. The media that produces curve 950 is Ceria with a feed to media ratio of 1.42. The dosage of DEG was 0.16% wt. Curve 960 in FIG. 20 shows that the grinding efficiency did not change substantially as the dosage of grinding aid was varied. In this test, the media fill was 70% and the feed rate was 1.0 metric tons per hour. Another characteristic of the mill grinding efficiency is disclosed in FIG. 21 wherein DEG dosage is still 0.16% by weight and the feed rate is changed between 0.4 metric tons per hour to about 2.0 metric tons per hour. Curve 972 is for a media fill of 77% and curve 974 is for a media fill of 70%. When practicing the invention, the feed rate has a large effect on the grinding efficiency of the mill. Whether the media fill level is 70% or 77%, the grinding efficiency increases sharply as the feed rate is increased as shown by curves 972, 974. Turning now to FIG. 22, the effect of the size of the discharge opening for the mill on the efficiency of the mill is represented by curve 980. In the method used to develop curve 980, the media had 77% fill and a feed rate of 1.1 metric tons per hour. Grinding aid dosage was 0.16% by weight. Graphs 950, 960, 972 and 974 of efficiency for the mill indicate that the key to efficiency of the mill is to load up the mill and reduce the outlet opening. High efficiency of the mill is obtained using scaled down conditions for nepheline syenite feedstock that are far more aggressive, such as 2.1 metric tons per hour with a media fill level of 77%. These operating parameters drastically increased operating efficiency of mill 10 used in performing the novel method.

Figure 23:
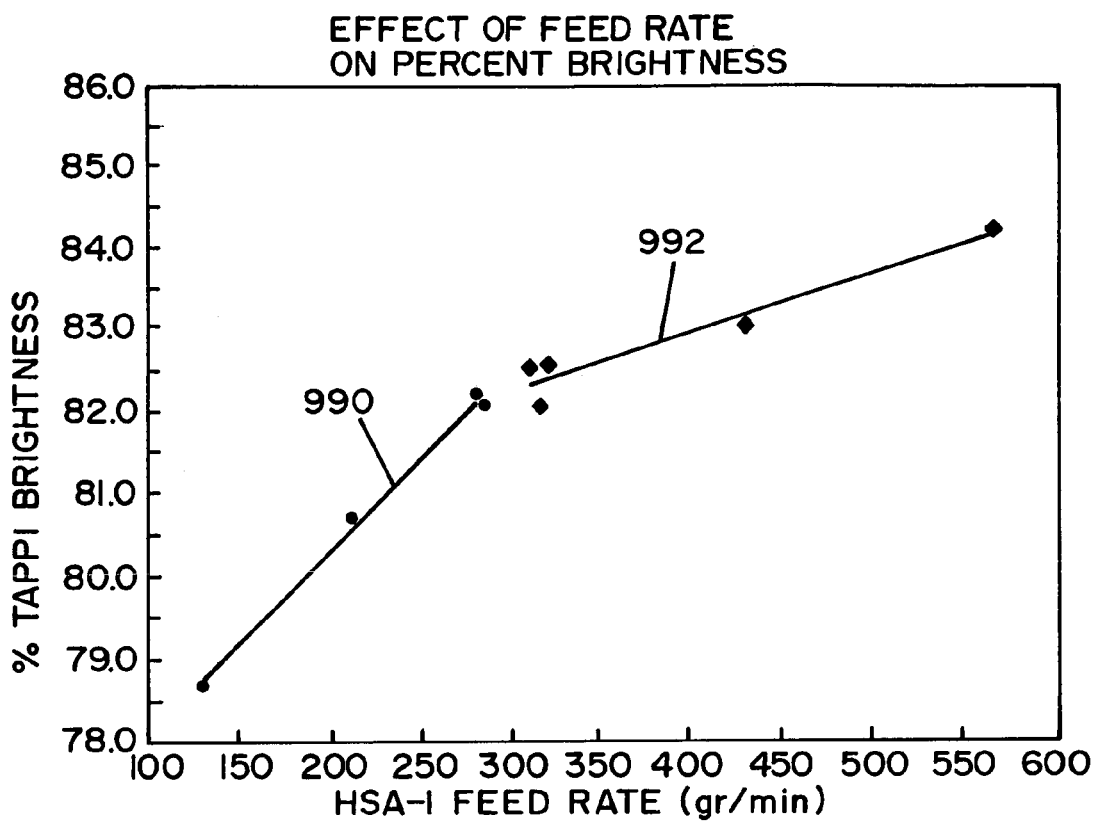
Figure 24:
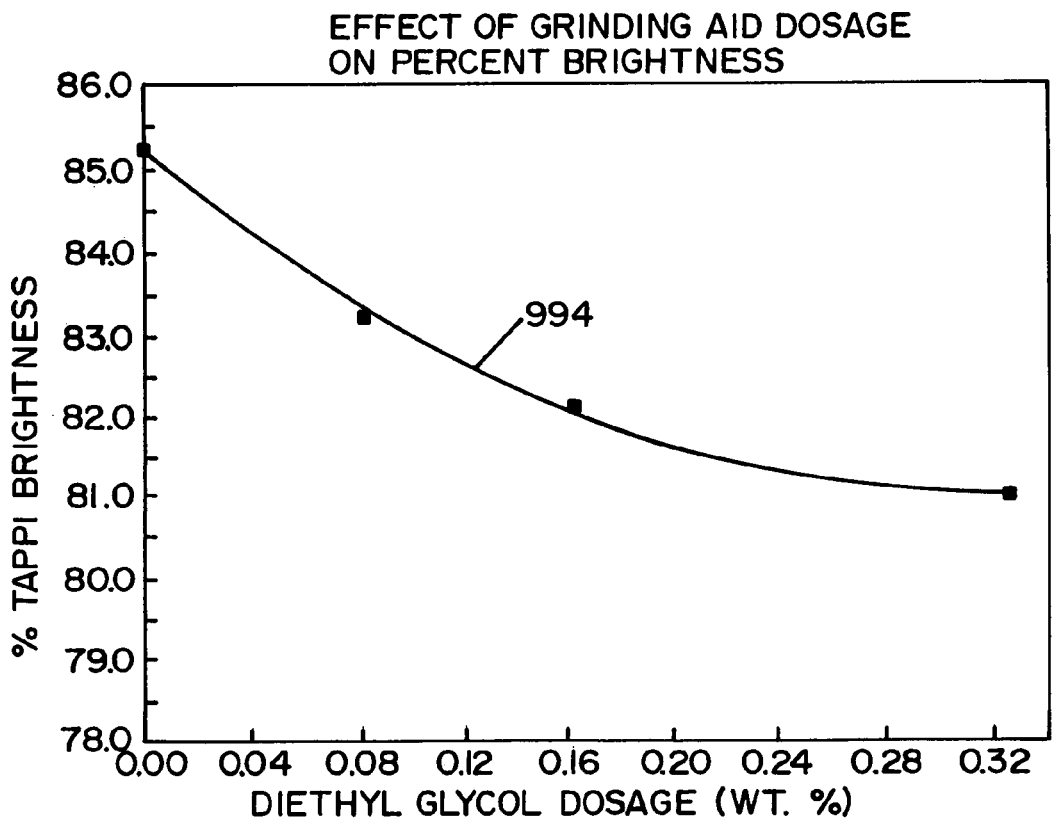

There are two factors which contribute to discoloration of final product FP. Brightness is a function of actual mill feed rate. Higher feed rates decrease exposure of the particles to the steel in the mill. Thus, increased brightness is obtained by increased feed speed as shown by curves 990, 992 in FIG. 23. Curve 990 is for a high media fill of 77%. Curve 992 is for a lower media fill of 70%. Thus, the feed speed through the mill in practicing the invention can be increased to over 200 gr/min with a fill of 77% and over 500 gr/min for a fill of 70% to assist in obtaining better brightness. Brightness is also reduced by increasing the grinding aid dosage as shown by curve 994 in FIG. 24.

Summarizing operation of system S in practicing the novel invention, it has been determined that Ceria-stabilized zirconium oxide is the media to be used for grinding nepheline syenite feedstock F by mill 10. This material has a hardness of Mohs 9 and does not fracture and potentially cause a discharge gate of the mill. The incoming feedstock F contains approximately 25% particles less than 5 microns in size. After the grinding operation of the mill, intermediate powder P has approximately 35%-40% particles with a size less than 5 microns. Consequently, mill 10 produces 40%-60% additional small particles with a size of less than 5 microns. The degree of reduction of the particle size profile by mill 10 depends upon the feed rate. The higher the feed rate the lower the reduction in particle size profile. Of course, this depends upon the media fill level with the greater fill levels resulting in greater reduction in the particle size profile. To a lesser extent, the grinding aid dosage affects the reduction in the grain size profile. As indicated by the two curves in FIG. 21, higher feed rates may cause lesser reduction in the particle size profile, but they drastically increases the efficiency of the mill. This is because the power drawn during high feed rate is less than power at low feed rate. By narrowing the opening of the discharge gate there is an increase in grinding efficiency as illustrated by curve 980 in FIG. 22. This parameter has less effect on efficiency, than increasing the feed rate as can be seen by comparing the results of the curves in FIGS. 21 and 22. There is no detriment in discharging ground nepheline syenite from the mill through an opening in the gate as small as 0.5 mm. The discharge grate opening in the mill is preferably 1.0 mm. As to brightness, brightness loss is caused by feed rate in accordance with the teaching of curves 990, 992 in FIG. 23. Brightness loss also depends upon the grinding aid dosage which indicates that the desire to reduce or eliminate grinding aid has an advantage in practicing the present invention.

Having thus defined the invention, the following is claimed:

1. The method of converting granular igneous rock feedstock with a hardness of at least about 6 Mohs and a grain size profile to an ultra-fine grain finished product for subsequent commercial use, said ultra-fine grain product having a maximum grain size of less than about 6 microns, said method comprising:

(a) providing a dry preprocessed feedstock with a maximum particle size greater than about 20 microns and less than about 100 microns;

(b) grinding said feedstock in a dry state by passing said feedstock vertically downward through a continuous, high-speed stirred ball mill having stirring arms rotated at a selected high speed in a vertically extending chamber filled with a grinding media whereby said feedstock is ground into an intermediate powder by the action of said media as said media is moved at high speed by said rotating stirring arms, said intermediate powder having a drastically reduced grain size profile than the grain size profile of said feedstock;

(c) passing said intermediate powder through an air classifier using a rapidly moving high speed air stream traveling along a given path to convey said ultra-fine grain product along said path and from said classifier and to allow coarse particulate material including particles larger than said ultra-fine product to be separated from said intermediate powder by centrifugal force and then expelled from said classifier;

(d) collecting said ultra-fine product; and, (e) returning said coarse material to said high speed stirred ball mill for regrinding.

2. The method as defined in claim 1 wherein said granular igneous rock feedstock is nepheline syenite particulate feedstock.

3. A method as defined in claim 2 wherein said feedstock has a particle size of 99% particles less than about 50 microns.

4. A method as defined in claim 2 wherein said selected speed is 200-450 rpm.

5. A method as defined in claim 2 wherein said media is particles having a size of less than 5 mm.

6. A method as defined in claim 2 wherein said media is particles having a size of 2.0-2.5 mm.

7. A method as defined in claim 2 wherein said media has a hardness number of Mohs 9.

8. A method as defined in claim 2 wherein said media is ceria-stabilized zirconium oxide.

9. A method as defined in claim 2 wherein said media is selected from the class consisting of stabilized zirconium oxide, aluminum oxide and tungsten carbide.

10. A method as defined in claim 2 wherein substantially no grinding aid is used in grinding of said feedstock.

11. A method as defined in claim 2 wherein said stirred ball mill has a water cooling jacket.

12. A method as defined in claim 2 wherein said media fills about 50-80% of said grinding chamber.

13. A method as defined in claim 2 wherein said air classifier is a side draft classifier including a main classifying chamber with a vertical blade rotor rejector operated at a high rotating speed below an outlet hood and a lower expansion chamber, said rejector separating said ultra-fine product by allowing said product to pass radially through said rejector together with said high speed air stream, whereby said coarse material is collected in and by said lower expansion chamber.

14. A method as defined in claim 13 wherein said high rotating speed is greater than about 1400 rpm.

15. A method as defined in claim 2 wherein said feed rate of said stirred ball mill is 0.5-2.3 kg/min.

16. A method as defined in claim 2 wherein said feedstock has about 20-30% particles with a grain size of less than about 5-6 microns and said intermediate powder has about 35-40% particles with a grain size of less than about 5-6 microns.

17. A method as defined in claim 2 wherein said stirred ball mill has an adjustable discharge grate with an opening or slot of 0.5 to 1.5 mm.

18. A method as defined in claim 2 wherein the D50 size of said final product is in the range of 1.5 to 2.0 microns.

19. The method of converting a pre-processed nepheline syenite particulate feedstock with a grain size profile to an ultra-fine grain finish product for subsequent commercial use, said ultra-fine grain product having a grain size of less than about 6 microns, said method comprising:

(a) providing a dry feedstock with a controlled maximum particle size greater than about 20 microns and less than about 100 microns;

(b) grinding said feedstock in a dry state by passing said feedstock through a ball mill whereby said feedstock is ground into an intermediate powder, said intermediate powder having a drastically reduced grain size profile than the grain size profile of said feedstock;

(c) passing said intermediate powder in a dry state through an air classifier using a rapidly moving high speed air stream traveling along a given path to convey said ultra-fine grain product along said path and from said classifier and to allow coarse particulate material including particles larger than said ultra-fine product to be separated from said feedstock by centrifugal force and then expelled from said classifier, wherein said air classifier is a side draft classifier including a main classifying chamber with a vertical blade rotor rejector operated at a high rotating speed below an outlet hood and a lower expansion chamber, said rejector separating said ultra-fine product by allowing said product to pass radially through said rejector together with said high speed air stream, whereby said coarse material is collected in and by said lower expansion chamber;

(d) collecting said ultra-fine product; and, (e) returning said coarse material to said high speed stirred ball mill for regrinding.

* * * * *